(12) United States Patent
Matsuura et al.

(10) Patent No.: US 7,289,730 B2
(45) Date of Patent: Oct. 30, 2007

(54) OPTICAL PATH COMMUNICATION NETWORK, NODE, AND OPTICAL PATH SETUP METHOD

(75) Inventors: Nobuaki Matsuura, Sayama (JP); Naoaki Yamanaka, Tokyo (JP); Wataru Imajuku, Yokohama (JP); Eiji Oki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 880 days.

(21) Appl. No.: 10/417,038

(22) Filed: Apr. 16, 2003

(65) Prior Publication Data

US 2003/0198227 A1 Oct. 23, 2003

(30) Foreign Application Priority Data

Apr. 19, 2002 (JP) ............................. 2002-118101
May 20, 2002 (JP) ............................. 2002-144733

(51) Int. Cl.
*H04J 14/08* (2006.01)
(52) U.S. Cl. ...................................... 398/57; 370/395.2
(58) Field of Classification Search ................. 398/54, 398/57; 370/395.2–395, 395.41, 412–418, 370/428–429
See application file for complete search history.

(56) References Cited

U.S. PATENT DOCUMENTS 6,021,263 A 2/2000 Kujoory et al.

FOREIGN PATENT DOCUMENTS

| JP | 07-202844 | 8/1995 |
|----|-----------|--------|
| JP | 09-247190 | 9/1997 |
| JP | 11-355288 | 12/1999 |
| JP | 2001-111528 | 4/2001 |
| JP | 2001-333095 | 11/2001 |
| JP | 2002-33739 | 1/2002 |

OTHER PUBLICATIONS

Leon-Garcia et al. "Communication Networks: Fundamental Concepts and Key Architectures", McGraw Hill, Dec. 31, 2000, pp. 695-698 and 821.

(Continued)

*Primary Examiner*—Leslie Pascal
(74) *Attorney, Agent, or Firm*—Harness, Dickey & Pierce, P.L.C.

(57) ABSTRACT

A source node, along with transmitting an optical path setup request, notifies towards a destination node available resource information related to itself, pre-assigns the available resources which its own node has notified. Each of transit nodes, along with relaying towards the destination node the optical path setup request which has been received from a previous hop node, notifies towards the destination node available resource information related to itself, and pre-assigns the available resources which each of their own nodes has notified. The destination node, along with reserving a resource which is to be used for setting up an optical path based upon an optical path setup request which has been received, transmits a resource reservation request towards the source node. The transit nodes and the source node actually reserve an available resource which has been pre-assigned, based upon a resource reservation request from a next hop node.

45 Claims, 19 Drawing Sheets

OTHER PUBLICATIONS

Japanese Office Action dated Feb. 21, 2006, issued on counterpart Japanese Patent Application No. 2002-118101.

Arakawa et al., "Performance Analysis of Wavelength Assignment Method for High-Speed Data Transfer on Photonic Networks," IEICE Journal B, vol. J83-B, No. 4, Apr. 2000, pp. 424-433.

Miyamoto et al., "On Call Processing in All-Optical Networks", Technical Report of IEICE, Feb. 1998, vol. 97, No. 534, SSE 97-163, pp. 1-6.

Katsuhiro Shimano, et al., MPLambdaS Demonstration Employing Photonic Routers (256X256 OLSPS) to Integrate Optical and IP Networks, National Fiber Optic Engineers Conference, 2001 Technical Proceedings, pp. 5-13, 2001.

FIG. 2

| WAVELENGTH | IN USE | PRE-ASSIGNED |
|---|---|---|
| $\lambda 1$ |   | 1 |
| $\lambda 2$ | 1 |   |
| $\lambda 3$ |   | 1 |
| $\lambda 4$ | 1 |   |
| $\lambda 5$ |   | 1 |
| ⋮ |   |   |
| $\lambda 32$ |   |   |

} ONLY K SELECTED

FIG. 3

| WAVELENGTH | IN USE | PRE-ASSIGNED |
|---|---|---|
| $\lambda 1$ |   | 1 |
| $\lambda 2$ | 1 |   |
| $\lambda 3$ |   | 3 |
| $\lambda 4$ | 1 |   |
| $\lambda 5$ |   | 2 |
| ⋮ |   | 2 |
| $\lambda 32$ |   |   |

FIG. 4

RSVP

| $\lambda 1$ | $\lambda 3$ | $\lambda 5$ | $\lambda 6$ |   |
|---|---|---|---|---|
| 1 | 3 | 2 | 2 |   |

NUMBER OF PRE-ASSIGNMENTS

Partial-WC Type III

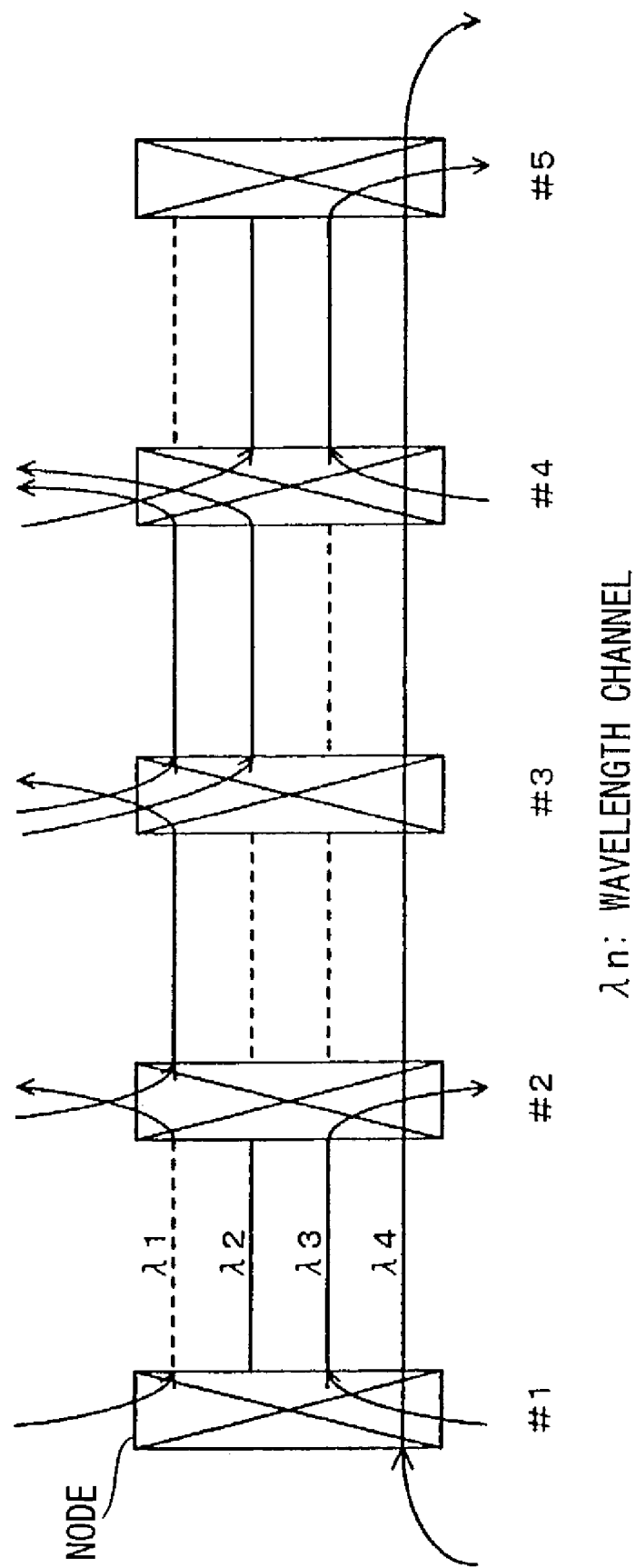

OPTICAL PATH COMMUNICATION NETWORK, NODE, AND OPTICAL PATH SETUP METHOD

BACKGROUND OF THE INVENTION

1. Field of the Invention

The present invention is employed in optical communication which sets up an optical path, and then sets up a connection over this optical path. In particular, the present invention relates to a technique for selecting a wavelength for setting up an optical path, and to an optical path setup technique for a high capacity optical path network which is implemented with an optical path switching device (for example a photonic router).

2. Description of the Related Art

The source node described in this specification is a node which transmits a path setup request, while the destination node is a node to which the path setup request is addressed. Furthermore, the optical path which is set up may either be a unidirectional path or a bidirectional path. In the case of a bidirectional path, it is possible for either the source node or the destination node to operate as a source for transmitting data or as a data recipient.

Due to the vast increase in data communication traffic upon the internet and the like, currently rapid progress is occurring with the introduction of node devices which offer a throughput of several Tbit/sec at the present time, and of 10 to 100 Tbit/sec in the near future. Photonic routers are a powerful means for implementing node devices which are endowed with this order of large scale transmission capability; for example, refer to the publication by K. Shimano, A. Imaoka, Y. Takigawa, and K. Sato in Technical Digest of NFOEC' 2001, vol. 1, pp. 5-13, July 2001. An overall view of an optical path network which employs such photonic routers is shown in FIG. 19. With these devices, the management of the optical path network is performed by each node in a distributed manner, and the setting up of the optical path connections is performed based upon signaling procedures between the various nodes.

The conventional technique employs the following type of procedures for setting up a path over this type of optical path network from the source node to the destination node.

First, when the source node transmits a path setup request towards the destination node, this path setup request is forwarded in order by each node upon the route which must be set up a path, and arrives at the destination node. After this, when the destination node transmits a resource reservation request towards the source node for reserving the resources (for example the wavelengths) which are to be used for setting up the path, this resource reservation request is forwarded in order by each node upon the above described route in the reverse direction to the direction when the path setup request was forwarded, and arrives at the source node. At this time, along with the resource reservation request being forwarded in order from the destination node to the source node, each node upon the above route performs reservation of the appropriate resources.

However, due to the influence of other connections, it may happen that the situations with regard to available resources such as wavelengths and the like at the time point at which each node upon the above described route receives the path setup request, and at the time point at which it receives the resource reservation request, are different. Due to this, despite it was possible to reserve the available resources when the path setup request was received, the situation may also undesirably come to pass that, when the resource reservation request has been received, it becomes impossible to reserve the available resources. Accordingly, there is a problem with the conventional procedure in terms of poor certainty and reliability in setting up a path.

On the other hand, a key point for implementing reduction in cost of the type of optical path network described above is to reduce to the utmost extent possible the number of wavelength converters which are provided within the network. As a means to this end, it is effective to prepare the wavelength converters optionally, and to set up the optical path while employing as few wavelength converters as possible.

This is because wavelength conversion at the present time is extremely expensive, so that, if it can be arranged for wavelength conversion not to be required, it is possible to perform transparent transmission of the signal while rendering electrical conversion and the like completely unnecessary.

Here, FIG. 20 shows an operation of conventional wavelength selection. Wavelength selection is performed link-by-link using the RSVP (Resource Reservation Protocol) protocol for signaling. Among the available wavelengths $\lambda 1$ through $\lambda 4$, the node A is connected to the node B using the wavelength $\lambda 1$, which is chosen randomly or because it is the lowest numbered wavelength available. At the node B, the same wavelength $\lambda 1$ is checked with the aim of performing as little wavelength conversion as possible, and, if the wavelength $\lambda 1$ is available as it happens, the node B is connected to the node C using this wavelength $\lambda 1$.

On the other hand, since, at the node C, the available wavelengths are $\lambda 3$ through $\lambda 5$, wavelength conversion will unfortunately be required whichever of these wavelengths is selected. As a result, the wavelength relay situation becomes $\lambda 1 \to \lambda 1 \to \lambda 3$, and wavelength conversion at the node C becomes necessary.

In the example shown in FIG. 20, if it had been possible to set up the entire connection with the wavelength $\lambda 3$, the wavelength relay situation would have become $\lambda 3 \to \lambda 3 \to \lambda 3$, so that no wavelength conversion at all would have been required. However since, conventionally, there was no means for selecting the available wavelength globally, accordingly, in the conventional wavelength selection procedure, it has not been possible to perform this type of consideration in advance, in order to select the available wavelength globally.

Furthermore, for implementing the setting up of an optical path while restricting the number of wavelength converters which are employed, it is necessary to optimize the selection of the wavelength channels between the source node and the destination node. For example, as shown in FIG. 21, for setting up an optical path from the node #1 to the node #5, the optical channel which is shown by the broken line is an available optical channel, and the path $\lambda 1 \to \lambda 3 \to \lambda 3 \to \lambda 1$ is that optical path on which the number of wavelength conversions at the transit nodes is the least.

However, the signaling procedure in such a conventional optical path setup scheme does not have the means for implementing the wavelength conversion and wavelength channel selection along the intermediate route while taking account of the wavelength conversion cost at each node as described above.

SUMMARY OF THE INVENTION

The present invention has been conceived against this background, and an objective thereof is to provide an optical path communication network, a node, and an optical path setup method, which can enhance the certainty and the reliability of optical path setup.

Furthermore, another objective of the present invention is to provide an optical path communication network, a node, and a method of finding an optical path setup wavelength, which can set up an optical path while using wavelength conversion (expensive) as little as possible, and can implement an optical network which excels from the point of view of economy.

Furthermore, another objective of the present invention is to provide an optical path network, a node, and an optical channel selection method, which can make it possible to set up an optical path while restricting the number of wavelength converters which are employed, and with which it is possible to set up the optical path while taking into account the capability and the status of utilization of the wavelength converters at each node; and accordingly it becomes possible to restrain the number of wavelength converters which are required to be provided for the optical path network, so that it is possible to reduce the cost of providing optical path network service.

A first aspect of the present invention is an optical path communication network comprising: a source node; a destination node; and transit nodes which are deployed upon a route between the source node and the destination node, wherein: the source node comprises a unit which transmits an optical path setup request; the destination node comprises a unit which reserves a resource which is to be used for setting up an optical path based upon the optical path setup request, and a unit which transmits a resource reservation request; each of the transit nodes comprises a relay unit which, along with relaying towards the destination node the optical path setup request which has been received from a previous hop node, relays towards the source node the resource reservation request which has been received from a next hop node; and the source node and each of the transit nodes further comprise: a notification unit which notifies towards the destination node available resource information which specifies available resources related to its own node which are to be used for setting up an optical path; a pre-assignment unit which pre-assigns the available resources which the notification unit of each of their own nodes has notified, based upon the optical path setup request; an actual reservation unit which actually reserves one of the available resources which have been pre-assigned, based upon the resource reservation request; and a unit which releases the ones among the resources which have been pre-assigned other than the one thereof which is actually reserved.

With the present invention as described above, for example, it becomes possible to pre-assign available resources along with the transmission of the optical path setup request from the source node to the destination node. Accordingly, it is possible to enhance the certainty and the reliability of path setup, by comparison with the case of reserving the resource along with the transmission of the resource reservation request from the destination node to the source node after the optical path setup request has arrived from the source node to the destination node.

It is desirable for the notification unit of each of the transit nodes to compare together the available resource information which has been notified by the previous hop node and available resource information of each of the transit nodes, and further to notify the available resource information related to those available resources thereof which are consistent towards the destination node; for the destination node to comprise a unit which compares together the available resource information which has been notified by the previous hop node and available resource information of the destination node, selects the information for any one available resource from among the available resource information related to those available resources thereof which are consistent, and notifies the selected information towards the source node as resource information to be used for setting up an optical path.

Here, it is desirable for the source node to comprise a unit which selects any K of available resources of the source node, where K is a natural number less than the number of aggregated resources, and takes the K available resources which have been selected as the available resource information which is notified by the notification unit of the source node.

In this manner, when searching for resources such as wavelengths or the like for setting up an optical path, it is desirable to restrict the number of available resources which are the object of selection to K items. By doing this, the selected objects are limited. Therefore, when a plurality of nodes are searching out resources for setting up an optical path at almost the same time, it is possible to avoid the situation of blockage of all the resources due to undesirable pre-assignment of all the resources by the one node whose timing of the start of searching is the quickest. As a result, it is possible to perform resource searching for setting up an optical path for a plurality of nodes at almost the same time. Furthermore, it is not necessary to perform resource searching for setting up the optical path for all the resources, so that the present invention is applicable to the case of increasing the speed of the resource searching process for optical path setup.

Furthermore, with regard to the value of K, it may be set to be the same at each node, or it may be set adaptively at each node according to the importance or the service class of the optical path which is to be set up. In other words, by setting the value of K to be larger in the nodes where there is a possibility that a vital loss may occur due to failure in setting up an optical path than in other nodes, it is made easier to acquire available resources when setting up an optical path at these node, so that it is thereby made possible to increase the success rate when setting up optical paths at these node. Or, by setting the value of K to be greater at nodes which deal with a class of service where it is not desirable for the data transmission rate to be reduced by the necessity of performing wavelength conversion or the like partway along the optical path than at other nodes, thereby the probability of interposition of wavelength conversion when setting up the optical path is reduced, and it becomes possible to increase the success rate when setting up a transparent type optical path at these node.

As has been explained above, according to the present invention, it is possible to set up an optical path while employing as little expensive wavelength conversion and the like as possible. Due to this, it is possible to implement an optical network which excels in cost effectiveness.

Furthermore, as for the source node, this is the node on the source side of the optical path setup request, while the destination node is the node on the destination side of this optical path setup request. In the case of a bidirectional optical path, during data transfer after setting up the optical path between the source node and the destination node, it is possible for either node to be the source which transmits data or to be the destination which receives data. Furthermore, the optical path may be either a unidirectional optical path or a bidirectional optical path.

Each pre-assignment unit may comprise a permission unit which permits overbooking of a plurality of connections which request setup to the K available resources which have been selected, and a unit which records the number of overbooked pre-assignments for each available resource which has been permitted by the permission unit, together with the available resource information; the notification units of the source node and the transit nodes may notify available resource information which includes information relating to the number of overbooked pre-assignments for each available resource; each of the transit nodes may comprise a unit which, for the same available resources, adds the number of overbooked pre-assignments of the available resources which each of the transit nodes has pre-assigned and the number of overbooked pre-assignments of the available resources which has been notified from the previous hop node; and the notification unit of the destination node may comprise a unit which selects the one of the available resources in which the number of overbooked pre-assignments is the least as the available resource to be notified towards the source node.

In this manner, by permitting overbooking of pre-assignment, along with enabling efficient utilization of resources such as wavelengths, it is possible to perform the resource selection process flexibly. If the destination node selects that available resource for setting up the optical path in which the number of overbooked pre-assignments is the least, then it is possible to minimize the probability of conflict with other connections.

It is desirable for each notification unit to perform notification using signaling packets according to the RSVP (Resource Reservation Protocol) protocol.

Since, by doing this, there is no necessity to perform special packet transmission for notification of the resources which are available, and it is possible to execute available resource notification during the process of the RSVP signaling procedure, accordingly there is no complication of the procedure by comparison with the conventional signaling procedure.

Furthermore, in the present invention, the costs which are required for passing through the optical switches in the transit nodes or the costs which are required for wavelength conversion while the path setup request is passing through the transit nodes upon the path from the source node to the destination node may be progressively added together, thereby the destination node may select the optical channel whose cost is the minimum from among all the costs which have thus been notified and may perform path setup.

Here, as the cost which is required for passing via an optical switch, for example, the cost between the incoming optical channel $\lambda i$ and the outgoing optical channel $\lambda j$, where $i=j$, becomes the cost which is required for passing via an optical switch, since in this case wavelength conversion is not required. Furthermore, the cost between the incoming optical channel $\lambda i$ and the outgoing optical channel $\lambda j$, where $i \neq j$, becomes the cost which is required for wavelength conversion, since in this case wavelength conversion is required. The cost which is required for wavelength conversion is set as being greater than the cost which is required for passing via an optical switch. Due to this, the cost of a route which passes through a large number of wavelength converters becomes greater than the cost of a route which does not pass through wavelength converters, and accordingly, at the destination node, priority is given to selection of the route which necessarily passes through fewer wavelength converters.

Accordingly, it is possible to enable setup of the optical path while restricting the number of wavelength converters which are employed, so that, at this time, it is possible to set up the optical path while taking account of the capability of wavelength converters and the status of utilization thereof at each node. As a result, it becomes possible to restrict the number of wavelength converters which are required to be provided in the optical path network, so that it is possible to reduce the cost of providing optical path network service.

And it is desirable for each of the nodes to comprise a storage unit which calculates and stores, for each node, the cost which is required for passing from an incoming optical channel to an outgoing optical channel via an optical switch, or the cost which is required for wavelength conversion, respectively for a plurality of combinations of incoming optical channels and outgoing optical channels; the cost which is required for passing via optical switches, or the cost which is required for wavelength conversion, from the source node to the transit node through which the optical path setup request has transited is defined as optical channel cost information for each optical channel which is the object of a path setup request; with the relay unit comprising a unit which adds together the cost related to the optical channel which is the object of the path setup request included in the optical channel cost information which has arrived from the previous hop node and is written in the optical path setup request and the cost related to the optical channel which is stored by the storage unit, sums the addition results as the cost from the plurality of incoming optical channels which are the object of the path setup request to one outgoing optical channel which is the object of the path setup request, extracts the minimum value from among the costs which have been summed, obtains the minimum values for all the outgoing optical channels which are the object of the path setup request, takes the minimum values as the optical channel cost information which has been updated by each of the transit nodes, and writes the numbers allocated to the incoming optical channels which yield the minimum values as optical channel tracking information into the optical path setup request which is transmitted to the next hop node; and for the unit which reserves a resource, along with searching for the optical channel whose cost is the minimum from among the optical channels which are the object of path setup request at the previous hop node based upon the optical channel cost information which has arrived from the previous hop node and is written in the optical path setup request, and reserving the optical channel, recognizing respective incoming optical channels and outgoing optical channels for the transit nodes which have been transited, based upon the optical channel tracking information which corresponds to the optical channel cost information for the optical channel which has been searched, and directing the respective actual reservation units to reserve the optical channels which have been recognized.

Here, in the optical channel tracking information, for example, a number of incoming optical channels may be listed for a plurality of transit nodes which are passed through. Since the optical channel cost information is provided for each outgoing optical channel of the transit nodes, the destination node can read in the number of the outgoing optical channel for the previous hop node from this optical channel cost information, and can read in the number of the incoming optical channel for the previous hop node from the optical channel tracking information which corresponds to this optical channel cost information. In other words, since the number of the incoming optical channel for this previous hop node is the number of the outgoing optical channel at the previous-previous hop node, the destination node can also read in the number of the outgoing optical channel for the previous-previous hop node at the same time as reading in the number of the incoming optical channel of the previous hop node. Furthermore, the destination node can read in the number of the incoming optical channel for the previous-previous hop node from the optical channel tracking information for the previous-previous hop node. By proceeding in this manner, the destination node can read in all the optical channels which must be reserved all the way up to the source node, from the combination of the optical channel cost information and also the optical channel tracking information.

As has been explained above, according to the present invention, it is possible to enable the setup of optical paths while restricting the number of wavelength converters which are required, and, at this time, it is possible to set up an optical path while taking account of the wavelength converter capability and the utilization status thereof at each node. As a result, it becomes possible to reduce the number of wavelength converters which are required to be provided in the optical path network, so that it is possible to reduce the cost of providing optical path network service.

For example, the cost which is required for wavelength conversion in each node may desirably be established based upon the number of wavelength converters consumed and the remaining number thereof, or upon the amount of wavelength conversion capability consumed and the remaining amount thereof.

Furthermore, for example, it is desirable for the wavelength conversion capability in each node to be the product of the number of available wavelength converters, the total number of wavelength channels which can be input to the wavelength converters, the number of lines of incoming wavelength which can be selected by the wavelength converters, the total number of wavelength channels which can be output from the wavelength converters, and the number of lines of outgoing wavelength which can be selected by the wavelength converters.

A second aspect of the present invention is a node which is utilized in an optical path communication network which comprises a source node, a destination node, and transit nodes which are deployed upon a route between the source node and the destination node, comprising: a unit which transmits an optical path setup request, when the node operates as the source node; a unit which reserves a resource which is to be used for setting up an optical path based upon the optical path setup request, when the node operates as the destination node; a unit which transmits a resource reservation request, when the node operates as the destination node; a relay unit which, along with relaying towards the destination node the optical path setup request which has been received from a previous hop node, relays towards the source node the resource reservation request which has been received from a next hop node, when the node operates as one of the transit nodes; a notification unit which notifies towards the destination node available resource information which specifies available resources related to its own node which are to be used for setting up an optical path, when the node operates as the source node or as one of the transit nodes; a pre-assignment unit which pre-assigns the available resources which the notification unit of its own node has notified, based upon the optical path setup request, when the node operates as the source node or as one of the transit nodes; an actual reservation unit which actually reserves one of the available resources which have been pre-assigned, based upon the resource reservation request, when the node operates as the source node or as one of the transit nodes; and a unit which releases the ones among the resources which have been pre-assigned other than the one thereof which is actually reserved, when the node operates as the source node or as one of the transit nodes. In this manner, as described above, it is possible to enhance the certainty and the reliability of path setup.

The notification unit may further comprise: a unit which compares together the available resource information which has been notified by the previous hop node and available resource information of its own node, and notifies the available resource information related to those available resources thereof which are consistent towards the destination node, when the node operates as one of the transit nodes; a unit which compares together the available resource information which has been notified by the previous hop node and available resource information of its own node, selects the information for any one available resource from among the available resource information related to those available resources thereof which are consistent, and notifies the selected information towards the source node as resource information to be used for setting up an optical path, when the node operates as the destination node.

Here, it is desirable for the notification unit to comprise a unit which selects any K of available resources of its own node, and takes the K available resources which have been selected as the available resource information which is notified by the notification unit, when the node operates as the source node.

The pre-assignment unit may comprise a permission unit which permits overbooking of a plurality of connections which request setup to the K available resources which have been selected, and a unit which records the number of overbooked pre-assignments for each available resource which has been permitted by the permission unit, together with the available resource information; with the notification unit comprising: a unit which notifies available resource information which includes information relating to the number of overbooked pre-assignments for each available resource; a unit which, for the same available resources, adds the number of overbooked pre-assignments of the available resources which the node has pre-assigned and the number of overbooked pre-assignments of the available resources which has been notified from the previous hop node, when the node operates as one of the transit nodes; and a unit which selects the one of the available resources in which the number of overbooked pre-assignments is the least as the available resource to be notified towards the source node, when the node operates as the destination node.

It is desirable for each notification unit to perform notification using signaling packets according to the RSVP protocol.

And it is desirable for the node further to comprise a storage unit which calculates and stores, for its own node, the cost which is required for passing from an incoming optical channel to an outgoing optical channel via an optical switch, or the cost which is required for wavelength conversion, respectively for a plurality of combinations of incoming optical channels and outgoing optical channels, and wherein: the cost which is required for passing via optical switches, or the cost which is required for wavelength conversion, from the source node to the transit node through which the optical path setup request has transited is defined as optical channel cost information for each optical channel which is the object of a path setup request; and for the relay unit to comprise a unit which adds together the cost related to the optical channel which is the object of the path setup request included in the optical channel cost information which has arrived from the previous hop node and is written in the optical path setup request and the cost related to the optical channel which is stored by the storage unit, sums the addition results as the cost from the plurality of incoming optical channels which are the object of the path setup request to one outgoing optical channel which is the object of the path setup request, extracts the minimum value from among the costs which have been summed, obtains the minimum values for all the outgoing optical channels which are the object of the path setup request, takes the minimum values as the optical channel cost information which has been updated by its own node, and writes the numbers allocated to the incoming optical channels which yield the minimum values as optical channel tracking information into the optical path setup request which is transmitted to the next hop node; and for the unit which reserves a resource, along with searching for the optical channel whose cost is the minimum from among the optical channels which are the objects of path setup requests at the previous hop node based upon the optical channel cost information which has arrived from the previous hop node and is written in the optical path setup request, and reserving the optical channel, recognizes respective incoming optical channels and outgoing optical channels for the transit nodes which have been transited, based upon the optical channel tracking information which corresponds to the optical channel cost information for the optical channel which has been searched, and directs the actual reservation units of the source node and the transit nodes to reserve the optical channels which have been recognized.

A third aspect of the present invention is a program which, by being installed upon an information processing device, implements upon the information processing device functions which correspond to each node which is employed in an optical path communication network which comprises a source node, a destination node, and transit nodes which are deployed upon a route between the source node and the destination node, the program comprising the functions of: as a function when operating as the source node, implements a function of transmitting an optical path setup request; as a function when operating as the destination node, implements a function of reserving a resource which is to be used for setting up an optical path based upon the optical path setup request, and a function of transmitting a resource reservation request; as a function when operating as one of the transit nodes, implements a relay function of relaying towards the destination node the optical path setup request which has been received from a previous hop node, and relaying towards the source node the resource reservation request which has been received from a next hop node; and as a function when operating as the source node or as one of the transit nodes, implements a notification function of notifying towards the destination node available resource information which specifies available resources related to its own node which are to be used for setting up an optical path, a pre-assignment function of pre-assigning the available resources which the notification function of its own node has notified, based upon the optical path setup request, an actual reservation function of actually reserving one of the available resources which have been pre-assigned, based upon the resource reservation request, and a function of releasing the ones among the resources which have been pre-assigned other than the one thereof which is actually reserved. In this manner, as described above, it is possible to enhance the certainty and the reliability of path setup.

The notification function may further implement the functions of: as a function when operating as one of the transit nodes, implements a function of comparing together the available resource information which has been notified by the previous hop node and available resource information of its own node, and further notifying the available resource information related to those available resources thereof which are consistent towards the destination node; as a function when operating as the destination node, implements a function of comparing together the available resource information which has been notified by the previous hop node and available resource information of its own node, selecting the information for any one available resource from among the available resource information related to those available resources thereof which are consistent, and notifying the selected information towards the source node as resource information to be used for setting up an optical path.

In addition, as a function when operating as the source node, it is desirable to implement a function of selecting any K of available resources of its own node, and taking the K available resources which have been selected as the available resource information which is notified by the notification function.

As the pre-assignment function, there may be implemented: a permission function of permitting overbooking of a plurality of connections which request setup to the K available resources which have been selected; and a function of recording the number of overbooked pre-assignments for each available resource which has been permitted by the permission function, together with the available resource information, and wherein as the notification function, there may be implemented: as a function when operating as the source node or as one of the transit nodes, a function of notifying available resource information which includes information relating to the number of overbooked pre-assignments for each available resource; as a function when operating as one of the transit nodes, a function of, for the same available resources, adding the number of overbooked pre-assignments of the available resource which its own node has pre-assigned and the number of overbooked pre-assignments of the available resource which has been notified from the previous hop node; and as a function when operating as the destination node, a function of selecting the one of the available resources in which the number of overbooked pre-assignments is the least as the available resource to be notified towards the source node.

It is desirable for each notification function to implement a function of performing notification using signaling packets according to the RSVP protocol.

It is desirable, as a function which corresponds to each the node, for there to be implemented a storage function of calculating and storing, for each node, the cost which is required for passing from an incoming optical channel to an outgoing optical channel via an optical switch, or the cost which is required for wavelength conversion, respectively for a plurality of combinations of incoming optical channels and outgoing optical channels, and of defining, as optical channel cost information for each optical channel which is the object of a path setup request, the cost which is required for passing via optical switches, or the cost which is required for wavelength conversion, from the source node to the transit node through which the optical path setup request has transited; as the relay function, for there to be implemented a function of adding together the cost related to the optical channel which is the object of the path setup request included in the optical channel cost information which has arrived from the previous hop node and is written in the optical path setup request and the cost related to the optical channel which is stored in its own node, summing the addition results as the cost from the plurality of incoming optical channels which are the object of the path setup request to one outgoing optical channel which is the object of the path setup request, extracting the minimum value from among the costs which have been summed, obtaining the minimum values for all the outgoing optical channels which are the object of the path setup request, taking the minimum values as the optical channel cost information which has been updated by its own node, and writing the numbers allocated to the incoming optical channels which yield the minimum values as optical channel tracking information into the optical path setup request which is transmitted to the next hop node; and as the function of reserving a resource, for there to be implemented a function of, along with searching for the optical channel whose cost is the minimum from among the optical channels which are the objects of path setup requests at the previous hop node based upon the optical channel cost information which has arrived from the previous hop node and is written in the optical path setup request, reserving the optical channel, recognizing respective incoming optical channels and outgoing optical channels for the transit nodes which have been transited, based upon the optical channel tracking information which corresponds to the optical channel cost information for the optical channel which has been searched, and directing the actual reservation functions of the source node and the transit nodes to reserve the optical channels which have been recognized.

A fourth aspect of the present invention is a method of setting up an optical path, applied to an optical path communication network which comprises a source node, a destination node, and transit nodes which are deployed upon a route between the source node and the destination node, comprising the steps of: the source node, along with transmitting an optical path setup request, notifies towards the destination node available resource information which specifies available resources related to the source node which are to be used for setting up an optical path, and pre-assigns the available resources which its own node has notified; each of the transit nodes, along with relaying towards the destination node the optical path setup request which has been received from a previous hop node, notifies towards the destination node available resource information which specifies available resources related to each of the transit nodes, and pre-assigns the available resources which its own node has notified; the destination node, along with reserving a resource which is to be used for setting up an optical path based upon the optical path setup request which has been received from the previous hop node, transmits a resource reservation request towards the source node; each of the transit nodes, along with relaying towards the source node the resource reservation request which has been received from a next hop node, actually reserves one of the available resources which have been pre-assigned, based upon the resource reservation request, and releases the ones among the resources which have been pre-assigned other than the one thereof which is actually reserved; and the source node actually reserves one of the available resources which have been pre-assigned, based upon the resource reservation request which has been received from the next hop node, and releases the ones among the resources which have been pre-assigned other than the one thereof which is actually reserved. In this manner, as described above, it is possible to enhance the certainty and the reliability of path setup.

Each of the transit nodes may compare together the available resource information which has been notified by the previous hop node and available resource information of each of the transit nodes, and may further notify the available resource information related to those available resources thereof which are consistent towards the destination node; the destination node may compare together the available resource information which has been notified by the previous hop node and available resource information of the destination node, selects the information for any one available resource from among the available resource information related to those available resources thereof which are consistent, and notifies the selected information towards the source node as resource information to be used for setting up an optical path.

It is desirable for the source node to select any K of available resources of the source node, and to take the K available resources which have been selected as the available resource information notified towards the destination node.

The source node and the transit nodes may permit overbooking of a plurality of connections which request setup to the K available resources which have been selected, may record together the number of overbooked pre-assignments for each available resource which has been permitted with the available resource information, and may notify available resource information which includes information relating to the number of overbooked pre-assignments for each available resource; each of the transit nodes may add together, for the same available resources, the number of the overbooked pre-assignments of the available resource which each of the transit nodes has pre-assigned and the number of the overbooked pre-assignments of the available resource which has been notified from the previous hop node; the destination node may select the one of the available resources in which the number of the overbooked pre-assignments is the least as the available resource to be notified towards the source node.

It is desirable for each notification to be performed using signaling packets according to the RSVP protocol.

It is desirable for each node to calculate and to store, for each node, the cost which is required for passing from an incoming optical channel to an outgoing optical channel via an optical switch, or the cost which is required for wavelength conversion, respectively for a plurality of combinations of the incoming optical channels and the outgoing optical channels; the cost which is required for passing via optical switches, or the cost which is required for wavelength conversion, from the source node to the transit node through which the optical path setup request has transited to be defined as optical channel cost information for each optical channel which is the object of a path setup request; for each of the transit nodes to add together the cost related to the optical channel which is the object of the path setup request included in the optical channel cost information which has arrived from the previous hop node and is written in the optical path setup request and the cost related to the optical channel which is stored in each of the transit nodes, to sum the addition results as the cost from the plurality of incoming optical channels which are the object of the path setup request to the one outgoing optical channel which is the object of the path setup request, to extract the minimum value from among the costs which have been summed, obtains the minimum values for all the outgoing optical channels which are the object of the path setup request, to take the minimum values as the optical channel cost information which has been updated by each of the transit nodes, and to write the numbers allocated to the incoming optical channels which yield the minimum values as optical channel tracking information into the optical path setup request which is transmitted to the next hop node; and for the destination node, along with searching for the optical channel whose cost is the minimum from among the optical channel cost information of the optical channels which are the objects of path setup requests at the previous hop node which has arrived from the previous hop node and is written in the optical path setup request, and reserving the optical channel, recognizes respective incoming optical channels and outgoing optical channels for the transit nodes which have been transited, based upon the optical channel tracking information which corresponds to the optical channel cost information for the optical channels which has been searched, and directs the source node and the transit nodes to reserve the optical channels which have been recognized.

A fifth aspect of the present invention is a recording medium which can be read by the information processing device, upon which the program according to the present invention is recorded. By recording the program of the present invention upon such a recording medium, it is possible to install this program according to the present invention upon a computer device, using this recording medium. Alternatively, it is possible to install this program according to the present invention directly upon the information processing device via a network from a server upon which this program according to the present invention is stored.

By doing this it is possible, using an information processing device such as a computer device, to set up optical paths while performing as little wavelength conversion and the like as possible, so that it becomes possible to implement an optical path communication network and a node, with which it is possible to implement an optical network which excels in cost efficiency.

Furthermore, it is possible, using an information processing device such as a computer device, to enable setup of optical paths while restricting the number of wavelength converters which are employed. At this time, it is possible to set up the optical paths while taking account of the wavelength converter capability and the status of utilization thereof at each node, so that it becomes possible to restrict the number of wavelength converters which are required to be provided in the optical path network, and it is possible to implement a node which can reduce the cost of providing optical path network service.

BRIEF DESCRIPTION OF THE DRAWINGS

FIG. 2 is a figure showing a wavelength utilization status table in this first preferred embodiment of the present invention.

FIG. 3 is a figure showing a wavelength utilization status table in the second preferred embodiment of the present invention.

FIG. 4 is a figure showing information for signaling, in this second preferred embodiment of the present invention.

FIG. 21 is a figure showing a link state model for explanation of an example of the conventional technique.

DETAILED DESCRIPTION OF THE PREFERRED EMBODIMENTS

Figure 1:
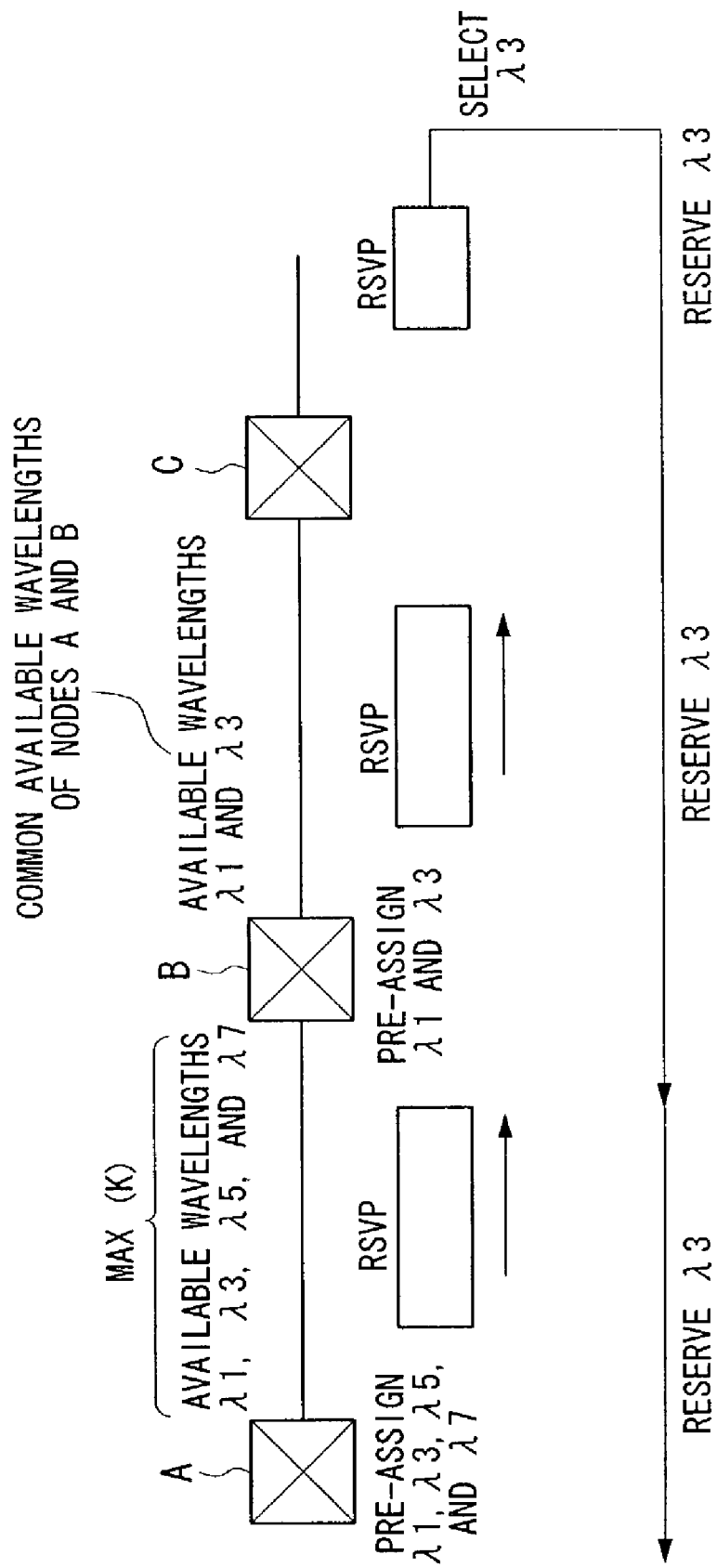
FIG. 1 is a figure for explanation of an optical path setup wavelength search procedure according to the first preferred embodiment of the present invention.
Figure 5:
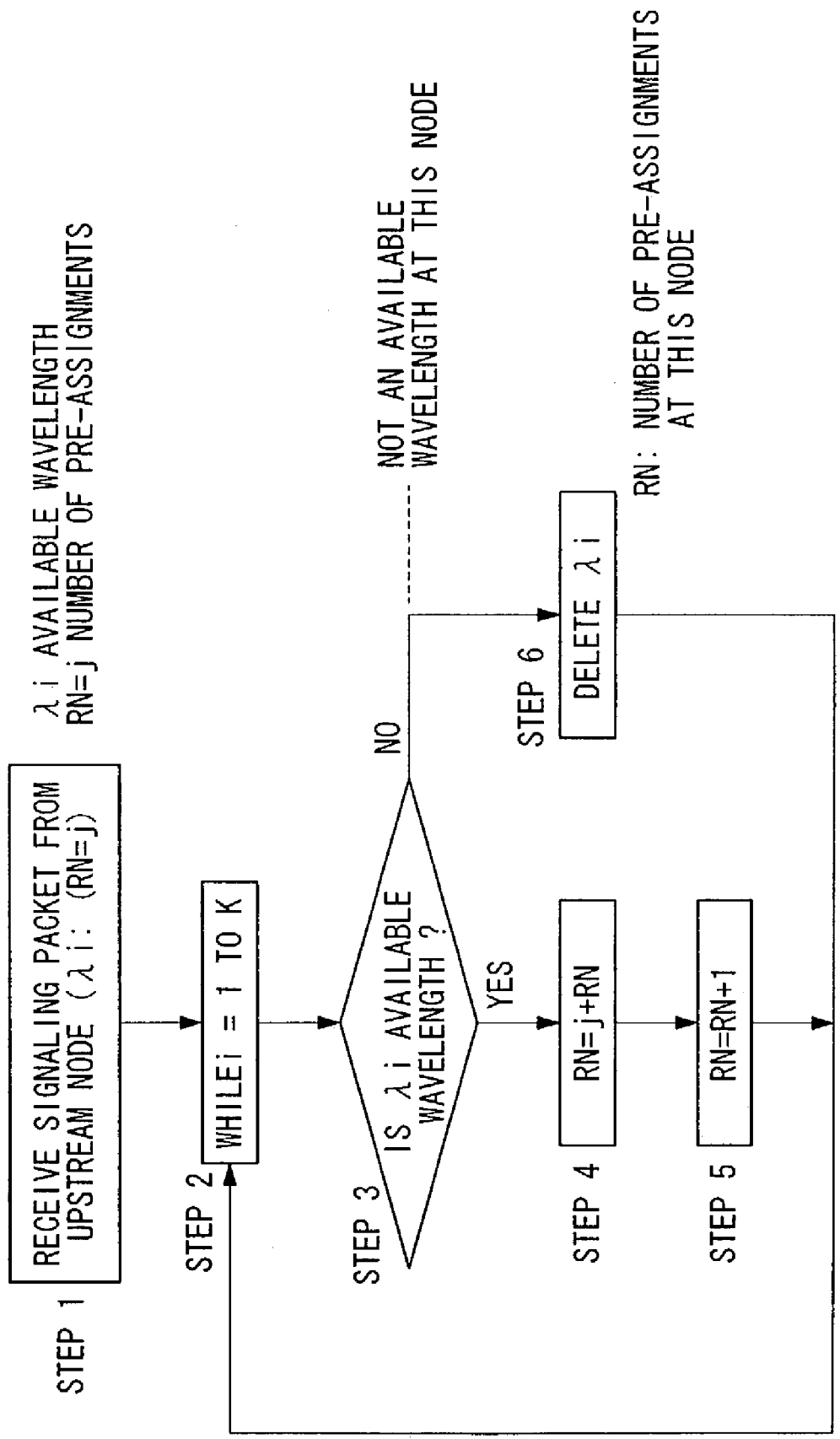
FIG. 5 is a flow chart showing a wavelength pre-assignment procedure in a transit node, in the third preferred embodiment of the present invention.
Figure 6:
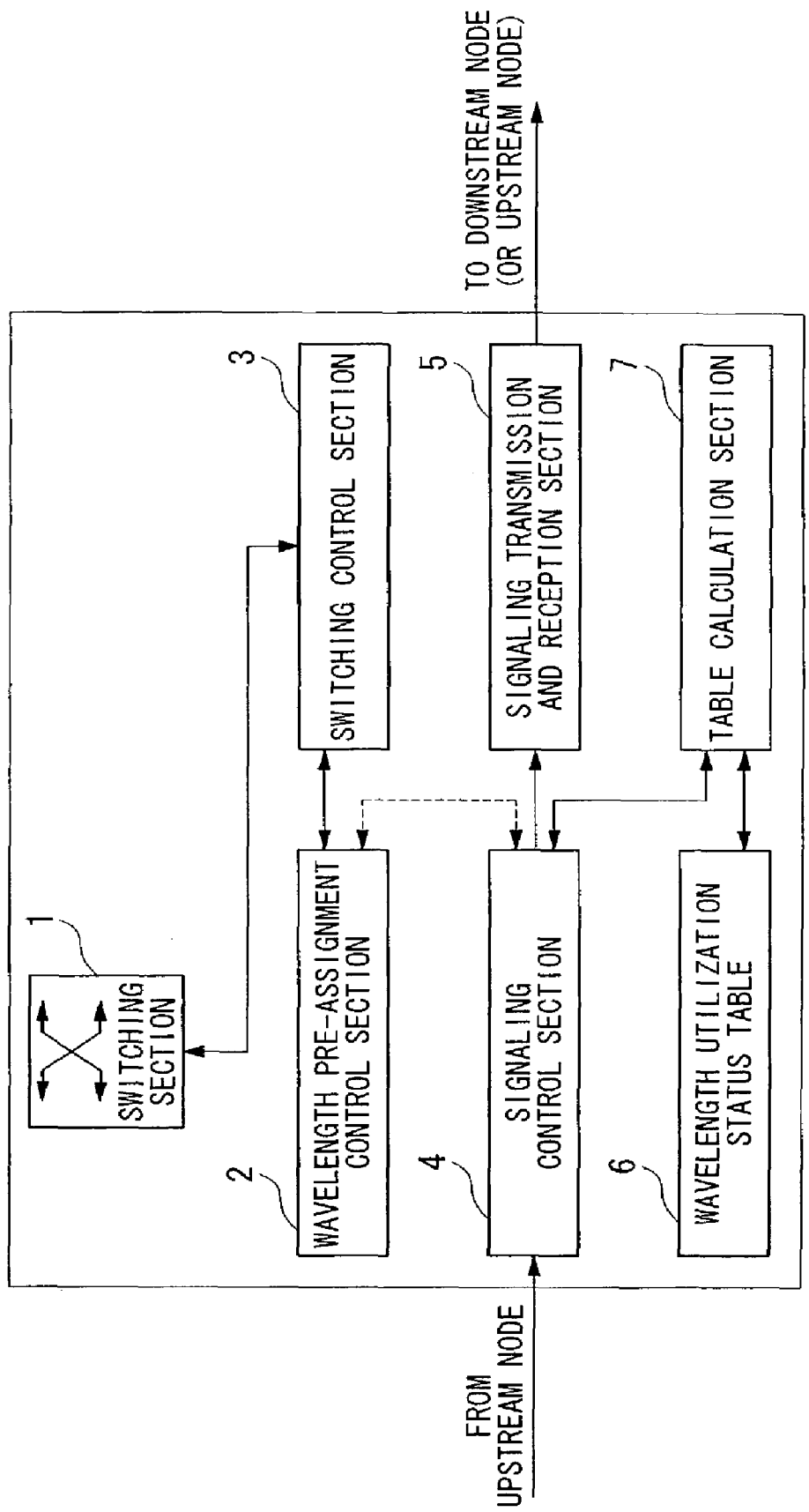
FIG. 6 is a block structural diagram of a node according to the fourth preferred embodiment of the present invention.

Optical path communication networks according to the first through the fourth preferred embodiments of the present invention will now be explained with reference to FIGS. 1 through 6. FIG. 1 is a figure for explanation of an optical path setup wavelength search procedure according to the first preferred embodiment of the present invention. FIG. 2 is a figure showing a wavelength utilization status table in this first preferred embodiment. FIG. 3 is a figure showing a wavelength utilization status table in the second preferred embodiment. FIG. 4 is a figure showing information for signaling, in this second preferred embodiment. FIG. 5 is a flow chart showing a wavelength pre-assignment procedure in a transit node, in the third preferred embodiment. In addition, FIG. 6 is a block structural diagram of a node according to the fourth preferred embodiment.

Each of the first through the fourth preferred embodiments of the present invention is an optical path communication network which comprises a source node A, a destination node C, and a transit node B which is deployed between the source node A and the destination node C; and: the node A comprises a signaling control section 4 and a signaling transmission and reception section 5 which notify its own available wavelength information toward the node C; the node B comprises a signaling control section 4 and a signaling transmission and reception section 5 which further notify the available wavelength information which is common among the available wavelength information which has been notified by the node A and its own available wavelength information toward the node C; the nodes A and B comprise wavelength pre-assignment control sections 2 which pre-assign available wavelengths which the signaling control sections 4 and the signaling transmission and reception sections 5 of each of their own nodes have notified; and the signaling control section 4 and the signaling transmission and reception section 5 of the node C select one item of the available wavelength information which is common among the available wavelength information which has been notified by the node B and its own available wavelength information, and notify said item of available wavelength information towards the node A as wavelength information to be used for setting up an optical path.

Here, the particular distinguishing feature of the first through the fourth preferred embodiments of the present invention is that the node A selects any K of its own available wavelengths and notifies them as its own available wavelength information towards the node C by the signaling control section 4 and the signaling transmission and reception section 5.

The wavelength pre-assignment control section 2 permits overbooking of a plurality of connections which request setup to the K available wavelengths which have been selected, and notifies to the node B the number of overbooked pre-assignments for each of these available wavelengths which have been permitted along with the available wavelength information, while the wavelength pre-assignment control section 2 of the node B adds together, for the same available wavelengths, the number of overbooked pre-assignments of the available wavelength which it has pre-assigned itself, and the number of overbooked pre-assignments of the available wavelength which has been notified from the node A which is the previous hop node, and the signaling control section 4 of the node C selects the one of the available wavelengths whose number of overbooked pre-assignments is the smallest. It should be understood that the signaling control section 4 and the signaling transmission and reception section 5 perform notification between the various nodes using RSVP signaling packets.

The node of the first through the fourth preferred embodiments of the present invention may be implemented using a computer device, which is an information processing device. In other words, by installing upon a computer device a program which implements a function which corresponds to a node which is employed in an optical path communication network which comprises a source node A, a destination node C, and a transit node B which is deployed between the source node A and the destination node C, by implementing, as a function which corresponds to the node A, a function corresponding to the signaling control section 4 and to the signaling transmission and reception section 5 of notifying its own available wavelength information towards the destination node, by implementing, as a function which corresponds to the node B, a function corresponding to the signaling control section 4 and to the signaling transmission and reception section 5 of comparing together the available wavelength information which has been notified by the node A and its own available wavelength information, and further notifying the portions of this available wavelength information which are consistent towards the node C, by implementing, as a function which corresponds to the node A and to the node B, a function corresponding to the wavelength pre-assignment control section 2 of pre-assigning the available wavelengths which the signaling control section 4 and the signaling transmission and reception section 5 of its own node have notified, by implementing, as a function which corresponds to the node C, a function corresponding to the signaling control section 4 and the signaling transmission and reception section 5 of comparing together the available wavelength information which has been notified by the node B and its own available wavelength information, selecting one item from among the portions of this available wavelength information which are consistent, and notifying the available wavelength information towards the node A as wavelength information which is to be used for setting up an optical path, by implementing, as a function which corresponds to the node A, a function of selecting any K of its own available wavelengths and notifying them towards the node C by the signaling control section 4 and the signaling transmission and reception section 5 as its own available wavelength information, by implementing, as a function which corresponds to the wavelength pre-assignment control section 2, a permission function of permitting overbooking of a plurality of connections which are requested to be set up on the K selected available wavelengths and a function of recording, for each available wavelength which has been permitted by this permission function, the number of overbooked pre-assignments together with the available wavelength information, by implementing, as a function which corresponds to the wavelength pre-assignment control section 2 of the node B, a function of adding together, for the same available wavelength, the number of overbooked pre-assignments of the available wavelength which it has pre-assigned itself, and the number of overbooked pre-assignments of the available wavelength which has been notified from the node A which is the previous hop node, by implementing, as a function which corresponds to the signaling control section 4 and the signaling transmission and reception section 5 of the node C, a function of selecting that available wavelength whose number of overbooked pre-assignments is the smallest, and by implementing, as a function which corresponds to the signaling control section 4 and the signaling transmission and reception section 5, a function of performing notification using RSVP signaling packets, it is possible to implement upon this computer device a device corresponding to the node of the first through the fourth preferred embodiments of the present invention.

By recording the program according to any one of the first through the fourth preferred embodiments of the present invention upon a recording medium, it is possible to install this program according to any one of the first through the fourth preferred embodiments of the present invention upon a computer device, using this recording medium. Alternatively, it is possible to install this program according to any one of the first through the fourth preferred embodiments of the present invention directly upon a computer device via a network from a server upon which this program according to any one of the first through the fourth preferred embodiments of the present invention is stored.

By doing this it is possible, using a computer device, to set up optical paths while performing as little wavelength conversion as possible, so that it becomes possible to implement an optical path communication network and a node, with which it is possible to implement an optical network which excels in cost efficiency.

In the following, the first through the fourth preferred embodiments of the present invention will be described in detail.

First Preferred Embodiment

As the first preferred embodiment of the present invention, a method of selecting an available wavelength with a wavelength utilization status table in the node A will be explained using FIGS. 1 and 2. When setting up a wavelength path from the node A to the node C, first, wavelengths (λ1, λ3, λ5, and λ7) which are not currently in use are notified by the node A to the next node B within the range of an available wavelength maximum notification number K which is determined in advance ($1 \leq K < M$, where M is the number of aggregated wavelengths and K is a natural number). In the shown example, K=4.

The node B notifies those wavelengths which are common among its own available wavelengths, and the available wavelengths which have been notified from the node A—for example, the wavelengths λ1 and λ3—to the downstream node C. By repeatedly doing this, it is possible for the node C to be aware of the common available wavelengths among the node A, B, and C, and, if there are a plurality of common available wavelengths, the node C selects one of them and reserves the selected wavelength. In the FIG. 1 example, the node C has selected λ3, so that the node C transmits a wavelength reservation request toward the node A for requesting the reservation of λ3, and then the wavelength λ3 which has been pre-assigned is actually reserved by the nodes A through C.

The wavelength utilization status table shown in FIG. 2 manages the wavelengths which are in use for current actual connections, or which are pre-assigned for signaling. The node A selects a total of K available wavelengths which are not in use and which are not pre-assigned, and notifies to the downstream node B.

Furthermore, if there is no common available wavelength at a transit node, this transit node undertakes wavelength conversion, and again puts a total of K new optical wavelengths into an RSVP signaling packet and notifies to the downstream node.

Second Preferred Embodiment

The second preferred embodiment of the present invention will be explained with reference to FIGS. 3 and 4. Although, as shown in FIG. 3, in this second preferred embodiment, the wavelengths which are in use are of course not transmitted downstream as signaling information, with regard to wavelengths which are pre-assigned, pre-assignment for a plurality of connections is permitted. FIG. 4 shows an example of signaling for communicating the available wavelengths downstream.

The available wavelengths are transmitted downstream with the number of pre-assignments appended. In the downstream node B, the wavelengths which are in use are deleted from these available wavelengths, and the wavelengths which are available or are under pre-assignment are notified further downstream. In the final downstream node, the wavelength among these in which the number of pre-assignments is the smallest is assigned as the actual connection. The reason is that the wavelength in which the number of pre-assignments is the smallest is the one for which the probability of overlap during use with other connections is the low.

Third Preferred Embodiment

FIG. 5 shows a flow chart for the pre-assignment procedure in the node B, in the third preferred embodiment of the present invention. This flow chart relates to actions taken by the node B. The number of pre-assignments is stored in the RSVP signaling packet from the upstream node A, in the same manner as in the second preferred embodiment described above. The node B adds the number of pre-assignments by the node B to the number of pre-assignments stored in the RSVP signaling packet for these wavelengths which are pre-assigned by the upstream nodes and are not in use by the node B, notifies the number of pre-assignments obtained to downstream, and increases the number of pre-assignments of the node B.

In other words, a signaling packet from the upstream node A is received (in the step 1). At this time, the number RN of pre-assignments for the available wavelength λi is j. Then, in the step 3, a decision is made as to whether or not the available wavelength λi at the upstream node A is also an available wavelength at the node B. If it is also an available wavelength at the node B, the number of pre-assignments of the available wavelength λi at the node B and the number of pre-assignments of the available wavelength λi at the upstream node A are added together (in the step 4). By doing this, in the node B, the number of pre-assignments before the signaling packet from the upstream node A arrives comes to be added. Furthermore, "1" is also added to the number of pre-assignments (in the step 5), since a requirement has arisen for newly setting up a connection due to the arrival of the signaling packet. Moreover, if the result of the decision (in the step 3) is that the available wavelength λi at the upstream node A is not an available wavelength at the node B, then λi is deleted from the available wavelength information (in the step 6). The procedures of the steps 3 through 6 are repeated K times (in the step 2).

By doing this, in the final egress edge (the destination node), the sum of the numbers of pre-assignments in all the nodes which have been traversed is notified by the signaling packet.

Fourth Preferred Embodiment

FIG. 6 is a structural diagram of a photonic router which corresponds to the nodes A through C according to the fourth preferred embodiment of the present invention. In this photonic router, the signaling packet from the previous hop node is terminated at a signaling control section 4, and the available wavelength information and pre-assignment information contained in the signaling packet are calculated by a wavelength pre-assignment control section 2. This processing may for example, according to requirements, add the number of pre-assignments, store the information again in a signaling packet, and transmit this signaling packet to the next hop node. The information relating to the available wavelengths and/or the pre-assignment wavelengths is stored in a wavelength utilization status table 6. A table calculation section 7 performs rewriting of the wavelength utilization status table 6 according to commands from the signaling control section 4. It should be understood that a switching section 1 switches the connection of the optical path, and this switching section 1 is controlled by a switching control section 3.

Figure 7:
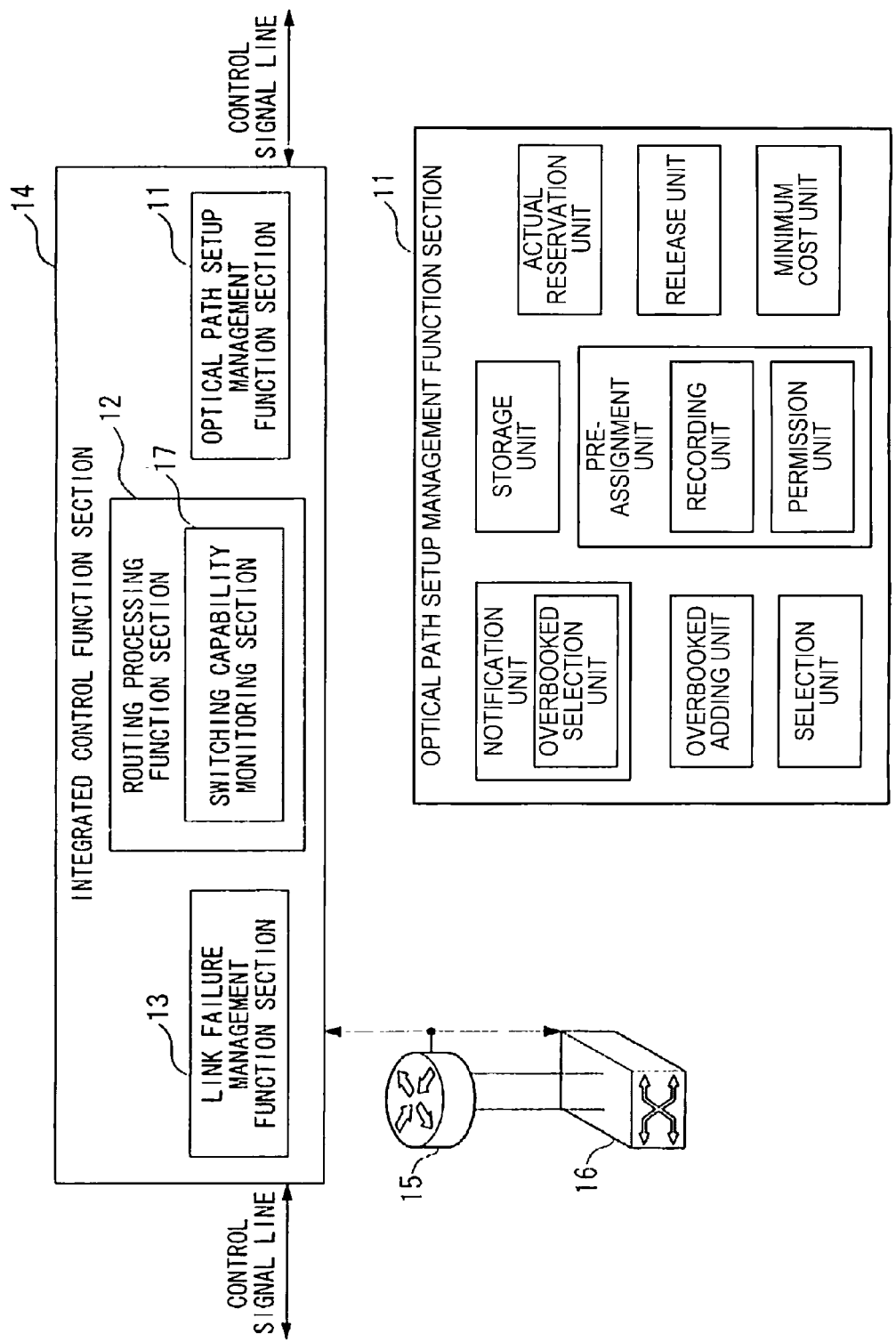
FIG. 7 is a block structural diagram of a node according to the fifth through the eighth preferred embodiments of the present invention.

In the following, optical path networks according to the fifth through the eighth preferred embodiments of the present invention will be explained with reference to FIGS. 7 and 8. FIG. 7 is a block structural diagram of a node according to the fifth through the eighth preferred embodiments of the present invention. In addition, FIG. 8 is a figure for explanation of an optical channel selection method in the fifth through the eighth preferred embodiments of the present invention.

In the explanation of the fifth through the eighth preferred embodiments which follows, for the convenience of explanation, the discussion will be made in terms of a source node #1, transit nodes #2 and #3, and a destination node #4; but in actuality all these four nodes #1 through #4 have the same structure, with the function of an optical path setup management function section 11 being changed autonomously according to the service required from the subject node.

Figure 8:
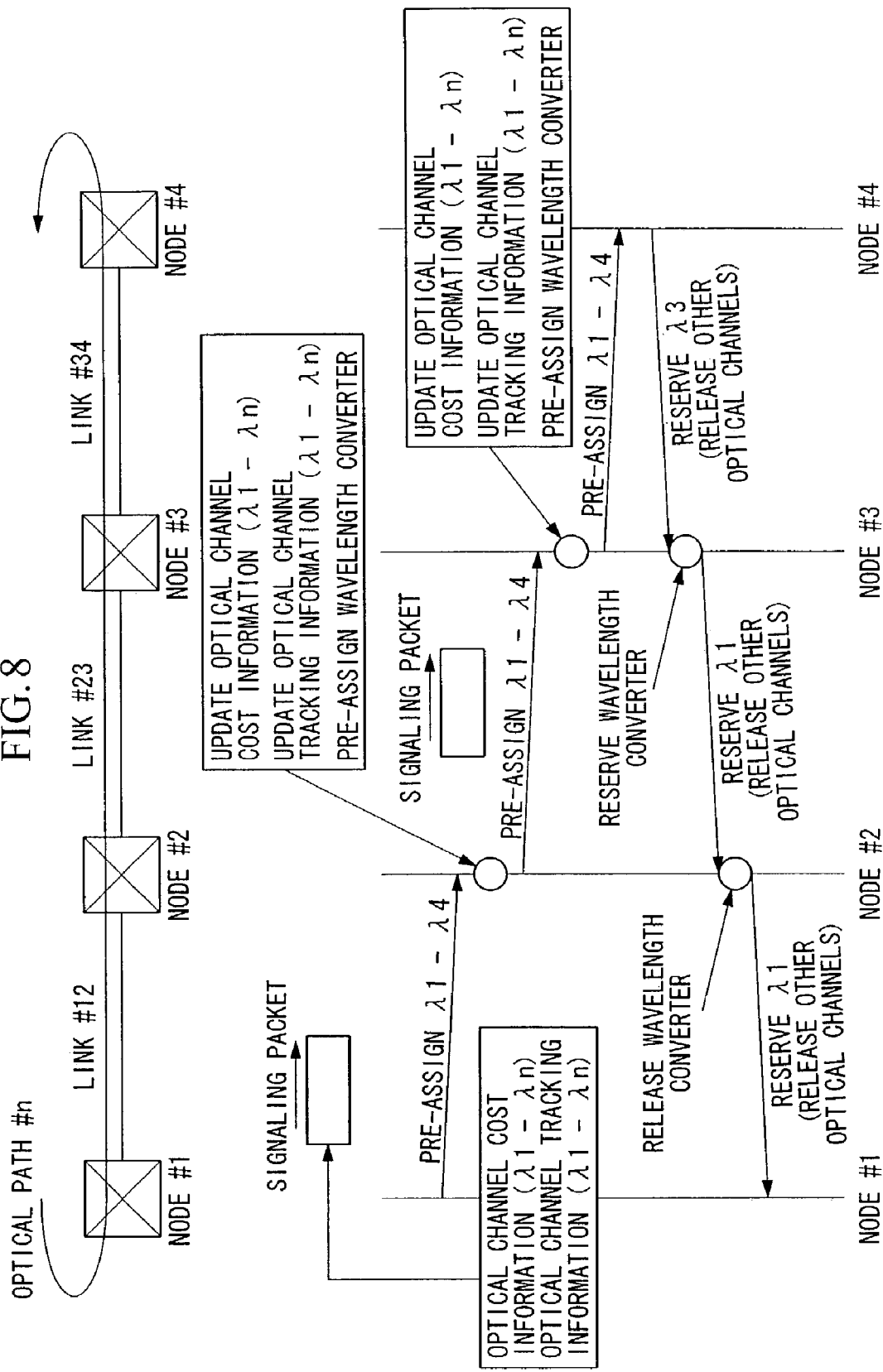
FIG. 8 is a figure for explanation of an optical channel selection method in the fifth through the eighth preferred embodiments of the present invention.

As shown in FIG. 7 and FIG. 8, each of the fifth through the eighth preferred embodiments of the present invention is an optical path network comprising a source node #1 which comprises an optical path setup management function section 11 which transmits an optical path setup request, a destination node #4 which comprises an optical path setup management function section 11 which receives this optical path setup request and reserves a resource which is to be used for setting up an optical path based upon the optical path setup request; and transit nodes #2 and #3 which are deployed upon a route between the source node #1 and the destination node #4, each of which relays optical path setup requests towards the destination node #4, and comprises an optical path setup management function section 11 which pre-assigns resources to be used for setting up an optical path based upon the optical path setup request, and which actually reserves a resource which has been pre-assigned based upon a resource reservation request from the optical path setup management function section 11 of the destination node #4.

The particular distinguishing feature of these fifth through eighth preferred embodiments of the present invention is that: the nodes #1 through #4 each comprises a switching capability monitoring section 17 of a routing processing function section 12 which calculates and stores, for this node, the cost which is required for passing from incoming optical channels to outgoing optical channels via an optical switch, or the cost which is required for wavelength conversion, respectively for a plurality of combinations of the incoming optical channels and the outgoing optical channels; the optical path setup management function section 11 defines as optical channel cost information, for each optical channel which is the object of a path setup request, the cost which is required for passing via optical switches, or the cost which is required for wavelength conversion, from the source node #1 to the transit node #h (where h is 2 or 3) through which the path setup request has transited, adds together the cost related to the optical channel which is the object of the path setup request included in the optical channel cost information which has arrived from the previous hop node and is written in the optical path setup request and the cost related to the optical channel which is stored by the switching capability monitoring section 17, sums the results of these calculations as the cost from the plurality of incoming optical channels which are the object of the path setup request to the one outgoing optical channel which is the object of the path setup request, extracts the minimum value thereof, obtains the minimum values for all the outgoing optical channels which are the object of the path setup request, takes these minimum values as the optical channel cost information which has been updated by this node, and writes the numbers allocated to the incoming optical channels which yield these minimum values as optical channel tracking information in the path setup request which is transmitted to the next hop node; and the optical path setup management function section 11 of the node #4 searches for the optical channel whose cost is the minimum from among the optical channels which are the objects of path setup requests at the previous hop node based upon the optical channel cost information which has arrived from the previous hop node and which is written in the optical path setup request, recognizes respective incoming optical channels and outgoing optical channels for the transit nodes which have been transited, based upon the optical channel tracking information which corresponds to the optical channel cost information for the optical channel which has been found, and reserves the optical channel which has been recognized, and also reserves the optical channel.

The cost which is required for wavelength conversion, in each node, may be established based upon the number of wavelength converters consumed and the remaining number thereof, or upon the amount of wavelength conversion capability consumed and the remaining amount thereof.

Furthermore, in each node, the wavelength conversion capability may be the product of the number of available wavelength converters, the total number of wavelength channels which can be input to the wavelength converters, the number of lines of incoming wavelength which can be selected by the wavelength converters, the total number of wavelength channels which can be output from said wavelength converters, and the number of lines of outgoing wavelength which can be selected by the wavelength converters.

Fifth Preferred Embodiment

The fifth preferred embodiment of the present invention is shown in FIG. 7. This fifth preferred embodiment is premised as a multi layer network which comprises a packet network which comprises packet switches and optical path links, and an optical network which comprises optical switches and fiber links.

This type of multi layer network can be made up from photonic routers which are implemented in an integrated manner by packet switches and optical switches. As shown in FIG. 7, each of these photonic routers comprises a packet switching section 15, an optical switching section 16, and an integrated control function section 14 which performs integrated management of these components.

Furthermore, control signals are mutually interchanged between the integrated control function sections 14 of each of the photonic routers via control signal lines. The optical switching section 16 is one in which a 128×128 switch is used, and it is endowed with a capability of inputting and outputting four fiber links on which 32 wavelengths are multiplexed. The transmission rate of each of these optical paths is 2.5 Gbit/sec, and they are terminated with SONET OC-48 interfaces.

The control signal lines have a transmission rate of 155 Mbit/sec and are made up of SONET OC-3 lines, and the control signals which are transmitted thereby may be, for example, OSFP/IS-IS protocol packets for acquiring the network topology of the photonic router network, or may be RSVP-TE/CR-LDP protocol packets which set up optical paths which are to be set up between packet switches or release them, or Link Management Protocol (LMP) packets which perform failure monitoring of the various fiber links.

Accordingly, the integrated control function section 14 of each of the photonic routers is equipped with function sections which process these control signal protocols, and comprises the routing processing function section 12 (which functions to process the OSPF/IS-IS protocol), the optical path setup management function section 11 (which functions to process the RSVP-TE/CR-LDP protocol), and the link failure management function section 13 for the optical fibers and the adjacent nodes (which functions to process the LMP protocol).

Here, the above described routing processing function section 12 defines the fiber link cost. The cost of the optical path which is accommodated by the fiber links is calculated using a Dijkstra algorithm based upon this fiber link cost, and orders are given to the optical path setup management function section 11 (the RSVP-TE/CR-LDP protocol function section), so as to set up the optical path using a route for which the sum of the costs between the source side and the destination side is minimum. Thus, the costs of the fiber links are allocated using the following values: the distances of the various fiber intervals, the reciprocals of the capacities of the fiber links (the reciprocals of the numbers of optical paths which can be accommodated thereby), and/or the actual expenses required for setting them up.

The optical path setup management function section 11 starts setting up an optical path upon a route which follows the commands of the routing processing function section 12. However, there are no commands from the routing processing function section 12 related to the wavelength channels which should be selected upon that route, so that a wavelength channel is selected according to the procedures described below.

Step 1: As shown in FIG. 8, path setup requests for wavelength channels are forwarded in order from the source node towards the downstream node, according to commands of the routing processing function section 12. In these requests, there are included information to the effect that, among the wavelength channels #1 through #M which could be defined with the fiber link connected to the downstream node, the wavelength channels #1-#j-#N have been pre-assigned, and also there is included optical channel cost information and optical channel tracking information related to the outgoing optical channel #j. It should be understood that the expression "wavelength channels #1-#j-#N" means that #j is some wavelength channel which is pre-assigned, and this wavelength channel #j is included in the range of the wavelength channels #1 through #N. In this preferred embodiment, the optical channel cost is allocated as the same zero cost for each and every channel.

In other words, the optical channel cost information which is transmitted to the downstream node assumes the value of zero at this stage in every case, and furthermore no particular value is set for the optical channel tracking information.

Figure 9:
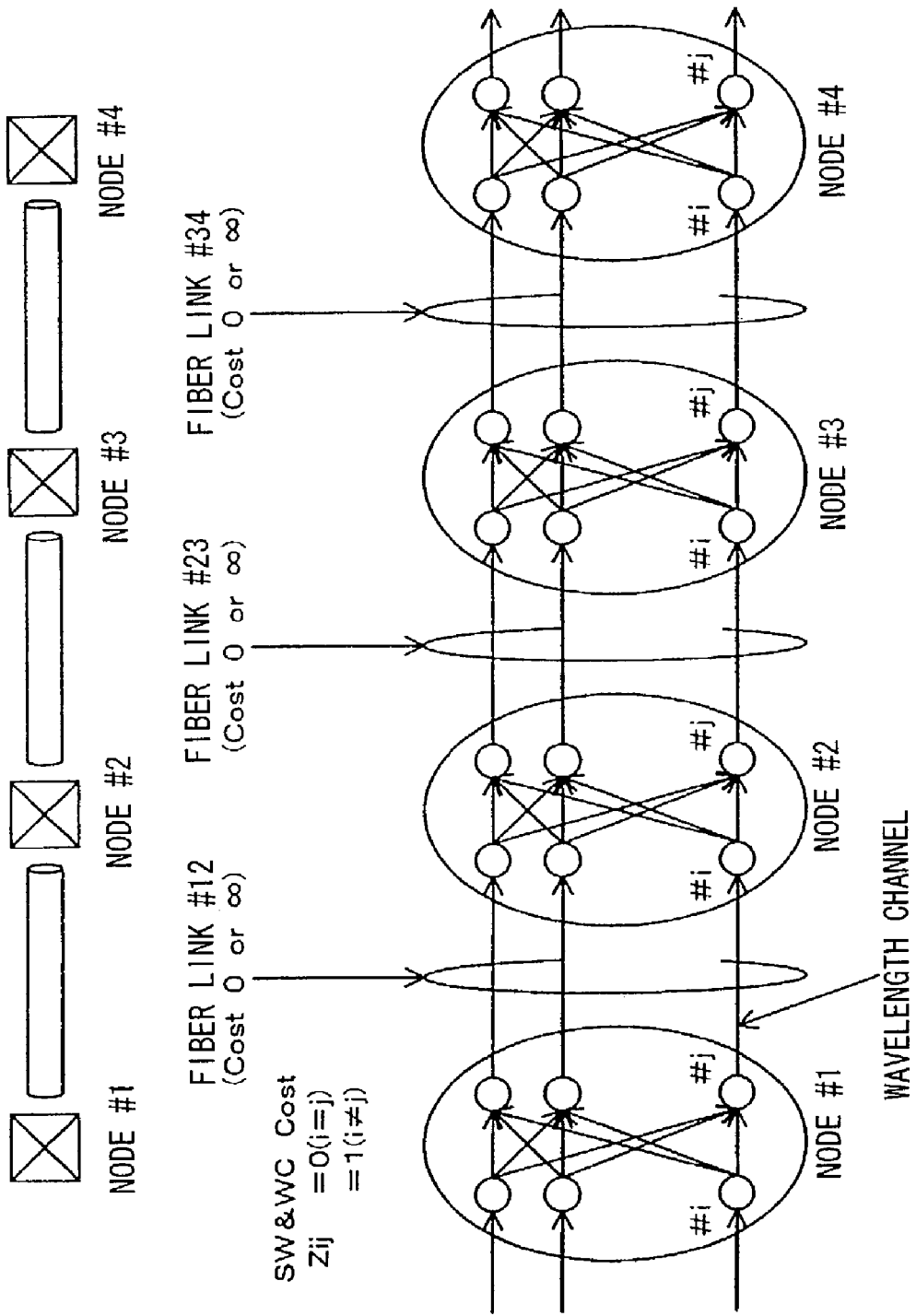
FIG. 9 is a figure showing a link state model for explanation of the fifth preferred embodiment of the present invention.

Step 2: In the transit node on the downstream side of the source node, an optical switch transit cost (SW Cost) or a wavelength conversion cost (WC Cost) between the incoming wavelength channel and the outgoing wavelength channel is defined according to a model like the one shown in FIG. 9, and this is stored as information. This information is stored by the switching capability monitoring section 17. Here, the wavelength conversion cost is supposed to be "1", while the cost for transiting the optical switch is supposed to be zero. In other words, each transit node adds on the cost only when wavelength conversion is performed in each transit node. This is based upon the concept that the number of wavelength converters which are employed is defined as the cost.

When a path setup request for a wavelength channel is received from an upstream node, this transit node refers to the optical channel cost information $C_i$ (i is the incoming optical channel number) for each incoming optical channel which is present in this request, and adds on the optical switch transit cost described above or a wavelength conversion cost matrix $Z_{ij}$ (i is the incoming optical channel number and j is the outgoing optical channel number). When this is done, although it becomes possible to obtain the cost information $C_1+Z_{1j}$, $C_2+Z_{2j}$, ... $C_n+Z_{nj}$ which relates to the outgoing optical channel #1 of this node, the one among these which has the minimum value, i.e., $\min(C_i+Z_{ij})$, is notified to the downstream node as being the optical channel cost information which is related to the outgoing channel #j of this node. In addition, information regarding the incoming optical channel #i which yields the minimum value is notified to the downstream node as optical channel tracking information. Furthermore, in the same way as was set up by the upstream node, among the wavelength channels #1 through #M which can be set up upon the fiber link which is connected to the downstream node, information to the purport that the wavelength channels #1-#j-#N have been pre-assigned is also notified.

Step 3: The destination node refers to the optical channel cost information $C_i$ (i is the incoming optical channel number) for each incoming optical channel which has been notified by the upstream node, and finds the incoming channel cost information thereamong which has the least value.

Figure 10:
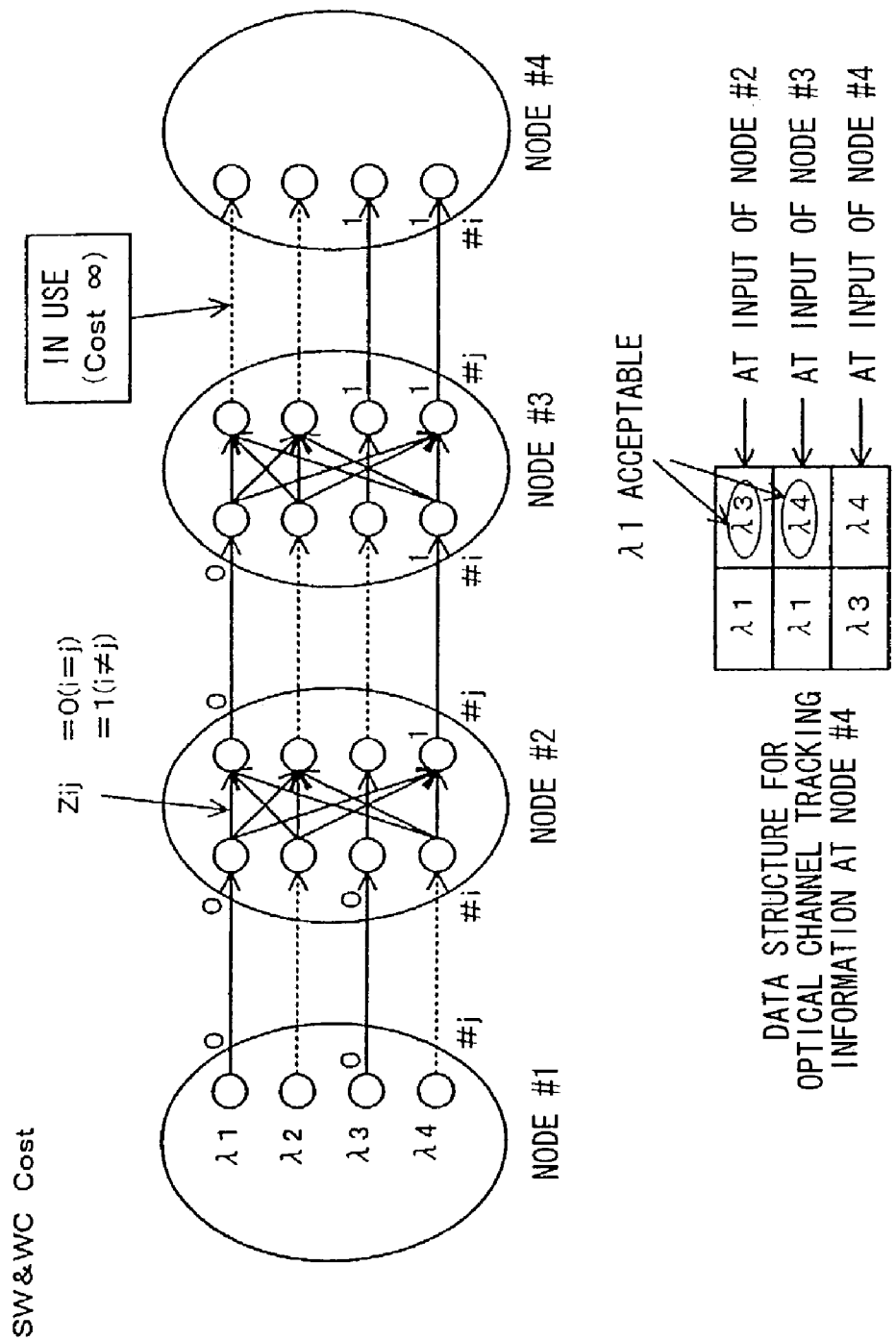
FIG. 10 is a figure for explanation of optical channel tracking information in this fifth preferred embodiment of the present invention.

Furthermore, the optical channel tracking information which corresponds to this incoming channel which has the minimum cost value is referred to. By referring to these items of information, in order from the bottom as shown in FIG. 10, it is possible to extract the wavelength channel information which should actually be reserved by the transit nodes #n−1, #n−2, .... #2 (in FIG. 10, by the transit nodes #3 and #2), and the wavelength channels which are actually reserved are determined based thereupon. It should be understood that, although it has been supposed in FIG. 10 that λ3 and λ4 are the ones which are respectively selected as the incoming optical channels for the nodes #2 and #3, it would also be acceptable to select λ1 as the incoming optical channel for either of the nodes #2 and #3.

Step 4: The wavelength channels are reserved in the order from the destination node towards the upstream node, according to the wavelength channel information which was obtained in the step 3. Besides, the pre-assignment for the wavelength channels for each interval between nodes which are not reserved is stopped, and the resources are released.

Figure 11:
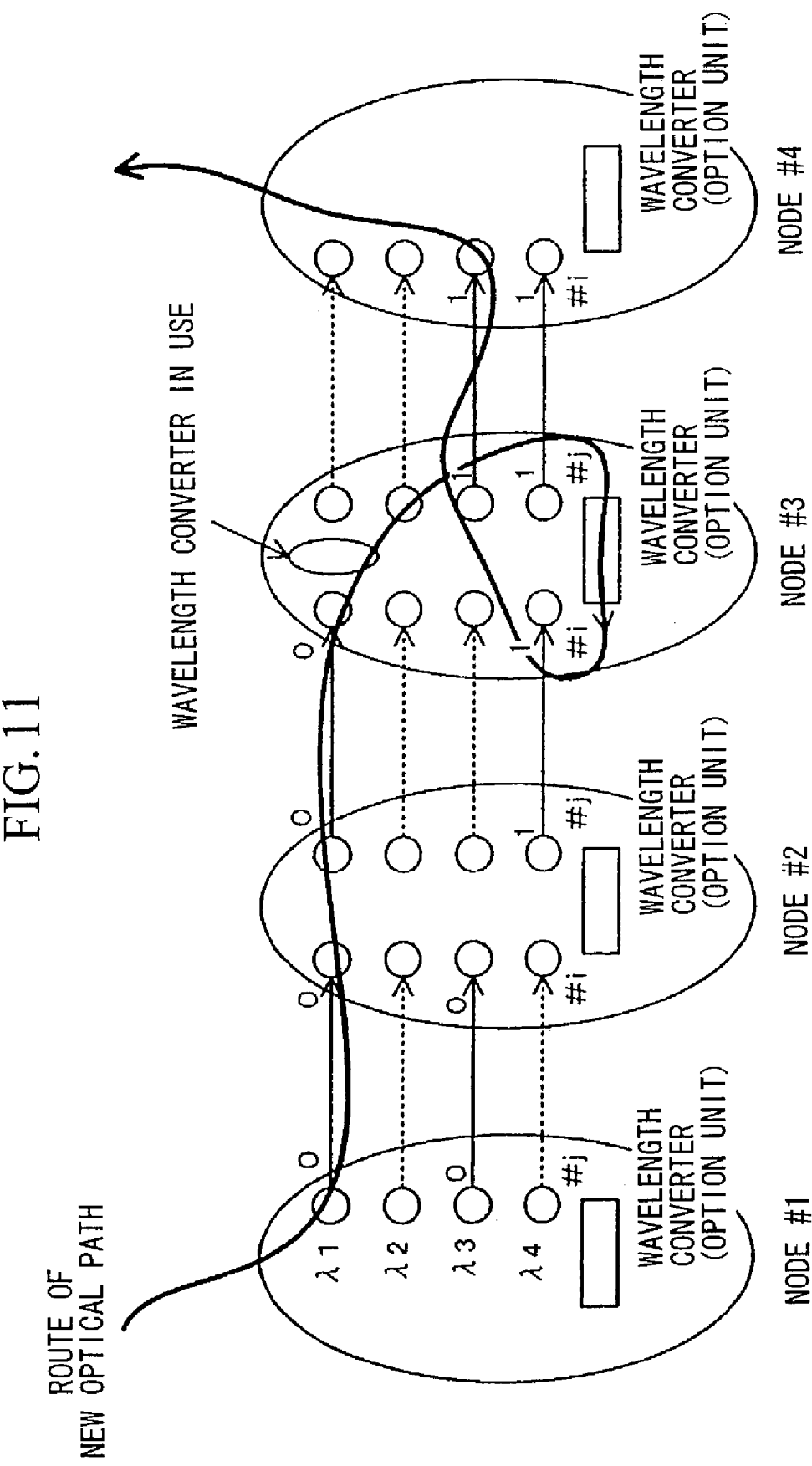
FIG. 11 is a figure showing an optical path pre-assignment state in this fifth preferred embodiment of the present invention.

According to the above-described series of procedures, wavelength channels come to be pre-assigned and reserved for the optical path in a manner as shown in FIG. 11. It should be understood that, in the above explanation, the optical channel cost is assumed to be zero. However, if the transmission quality via the various optical channels differs greatly, or if a high failure recovery class (a class for which the probability of failure recovery is high) is established for a specified optical channel from the viewpoint of handling, then it is possible to allocate a high cost for such an optical channel on which the transmission quality is high or whose failure recovery priority class is high. For example, if it is supposed that $C_i = \gamma Z_{ij}$ (where i≠j), then, according to the policy of handling the wavelength conversion, it is possible to allocate the optical channel cost by varying y over a range from about 0.1 to 10.

In this manner, with the wavelength (optical) channel selection method according to the present invention, by always ascertaining the cost of transiting the optical switches or the wavelength conversion cost as the minimum limit which is required for arriving at the outgoing optical channel of each transit node, thereby the cost of transiting the optical switches or the wavelength conversion cost which is the minimum limit which is required over the entire route between the source node and the destination node is ascertained quickly, and is reflected in the optical path setup signaling. By doing this, for the same path, it becomes possible flexibly to select, over each interval between transit nodes, the wavelength channel for which the number of times of performing wavelength conversion at the transit nodes is brought to the minimum limit, and thereby the number of wavelength converters which is required is reduced, and thus it becomes possible to provide a cost reduction over the network as a whole.

Sixth Preferred Embodiment

Figure 12:
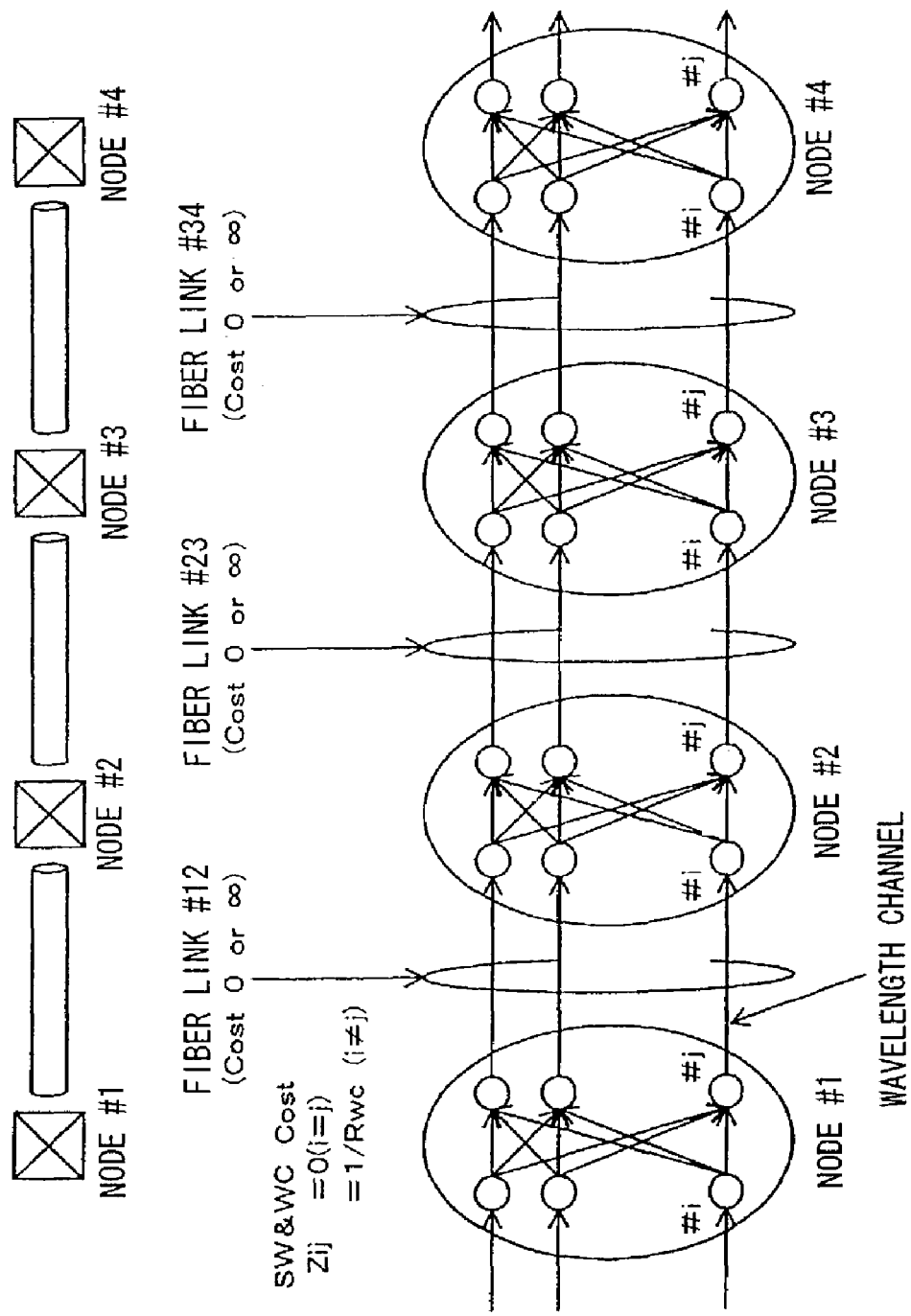
FIG. 12 is a figure showing a link state model for explanation of the sixth preferred embodiment of the present invention.
Figure 13:
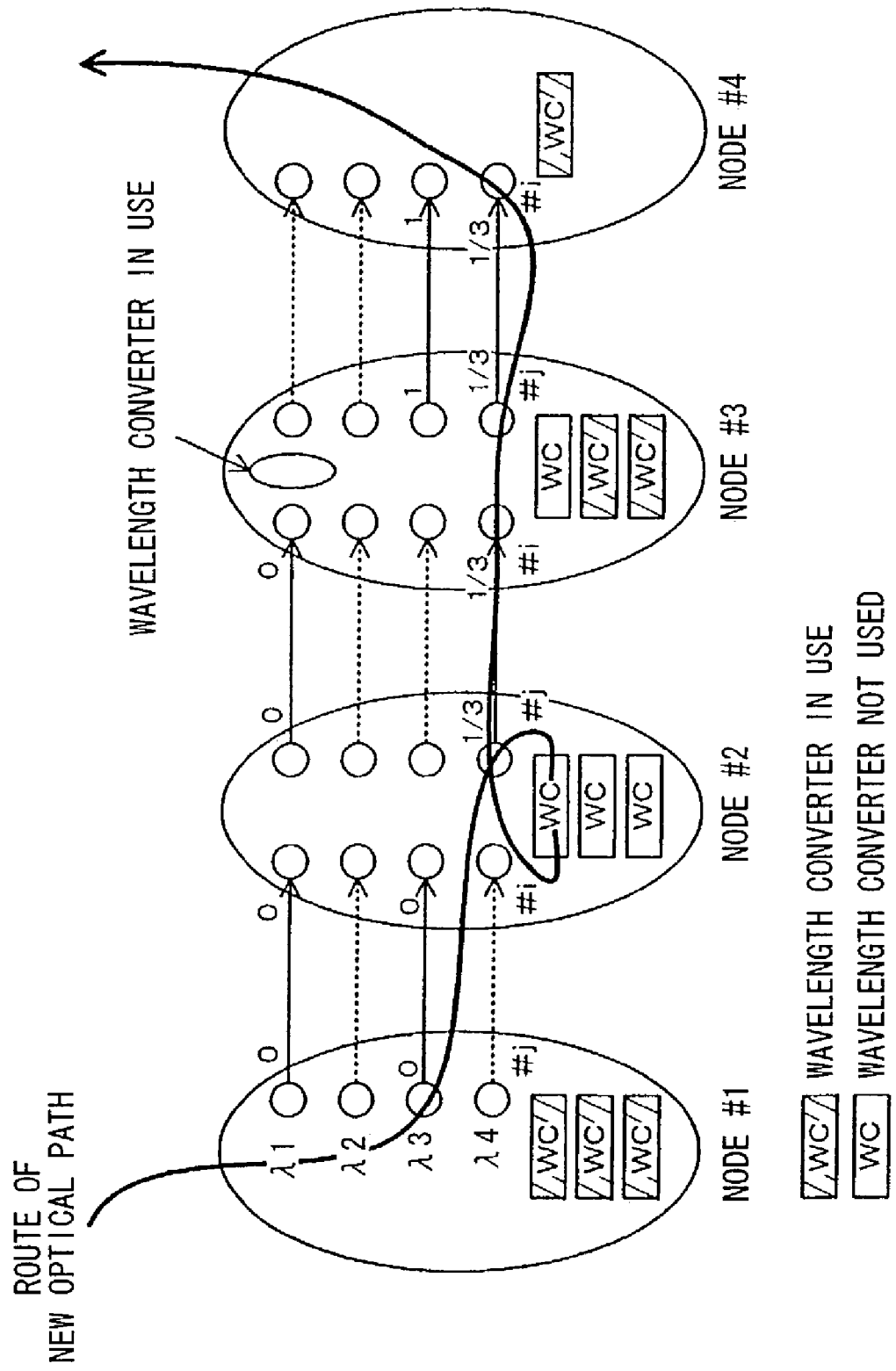
FIG. 13 is a figure for explanation of an optical channel selection method in the sixth preferred embodiment of the present invention.

The sixth preferred embodiment of the present invention is shown in FIG. 12. The basic operation of this sixth preferred embodiment is the same as that of the fifth preferred embodiment. The point in which they differ is that the wavelength conversion cost in each of the transit nodes is defined so as to be proportional to the reciprocal of the remaining number Rwc of wavelength converters at each transit node. In other words, it is supposed that $$Zij = 1/Rwc \text{ (for } i \neq j\text{) and}$$
$$= 0 \text{ (for } i = j\text{)},$$

so that it is pretended that the wavelength conversion cost is high at nodes where the remaining number of wavelength converters is low. As shown in FIG. 13, in this sixth preferred embodiment, just as in the case of the fifth preferred embodiment, in the optical path which is set up between the source node and the destination node, it is necessary to perform wavelength conversion once, either at the node #2 or at the node #3. However, the wavelength conversion cost at the node #2 at which the amount of remaining resources is plentiful is ⅓, which is less than the wavelength conversion cost at the node #3, which is 1. Accordingly, the optical path which is set up by this sixth preferred embodiment comes to perform the wavelength conversion at the node #2 at which the amount of remaining resources is plentiful. In this manner, with the structure of this sixth preferred embodiment, it is possible quickly to select the node at which to perform wavelength conversion when performing optical path setup, while taking account of the remaining resources of wavelength converters.

Seventh Preferred Embodiment

Figure 14:
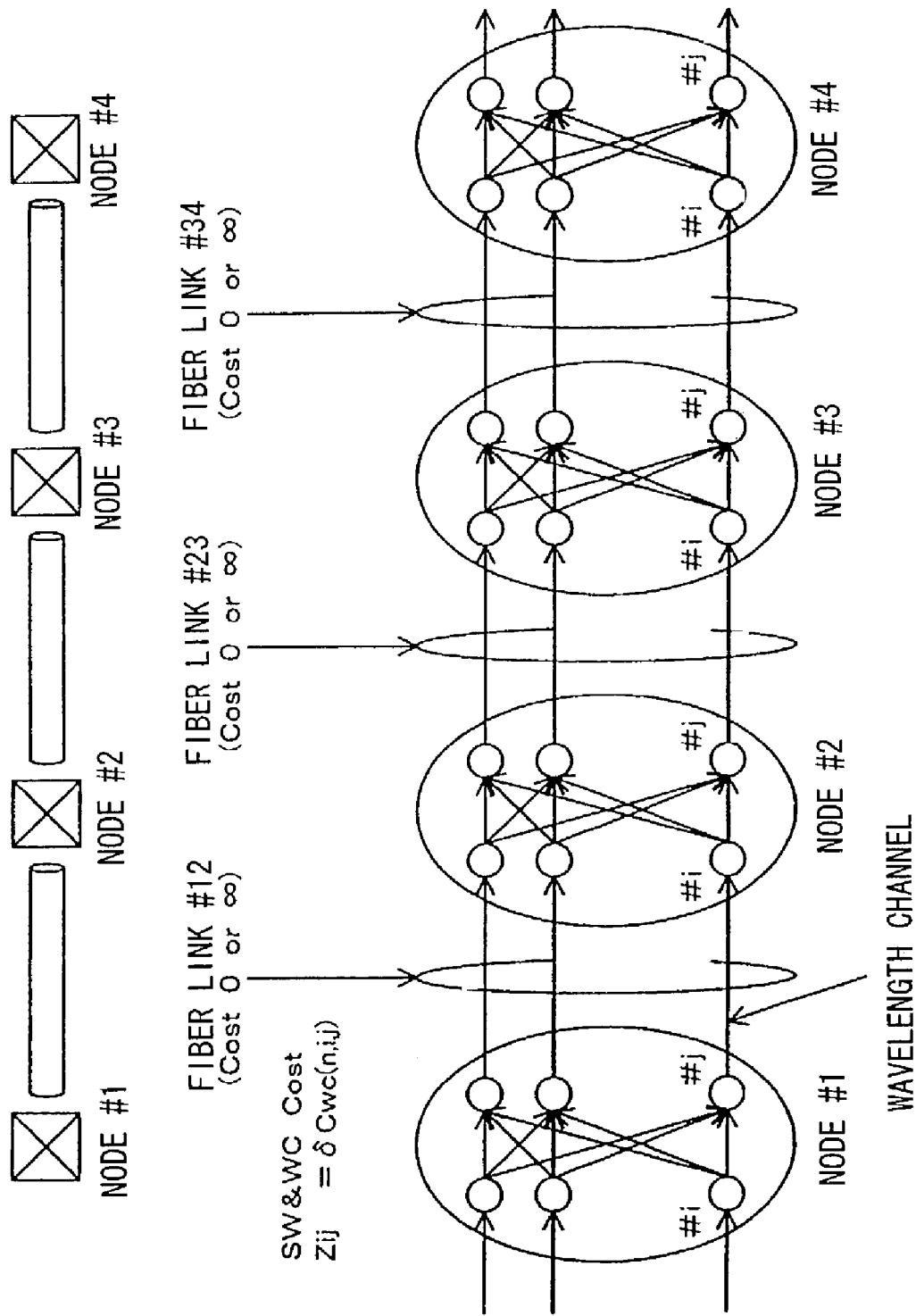
FIG. 14 is a figure showing a link state model for explanation of the seventh preferred embodiment of the present invention.
Figure 15:
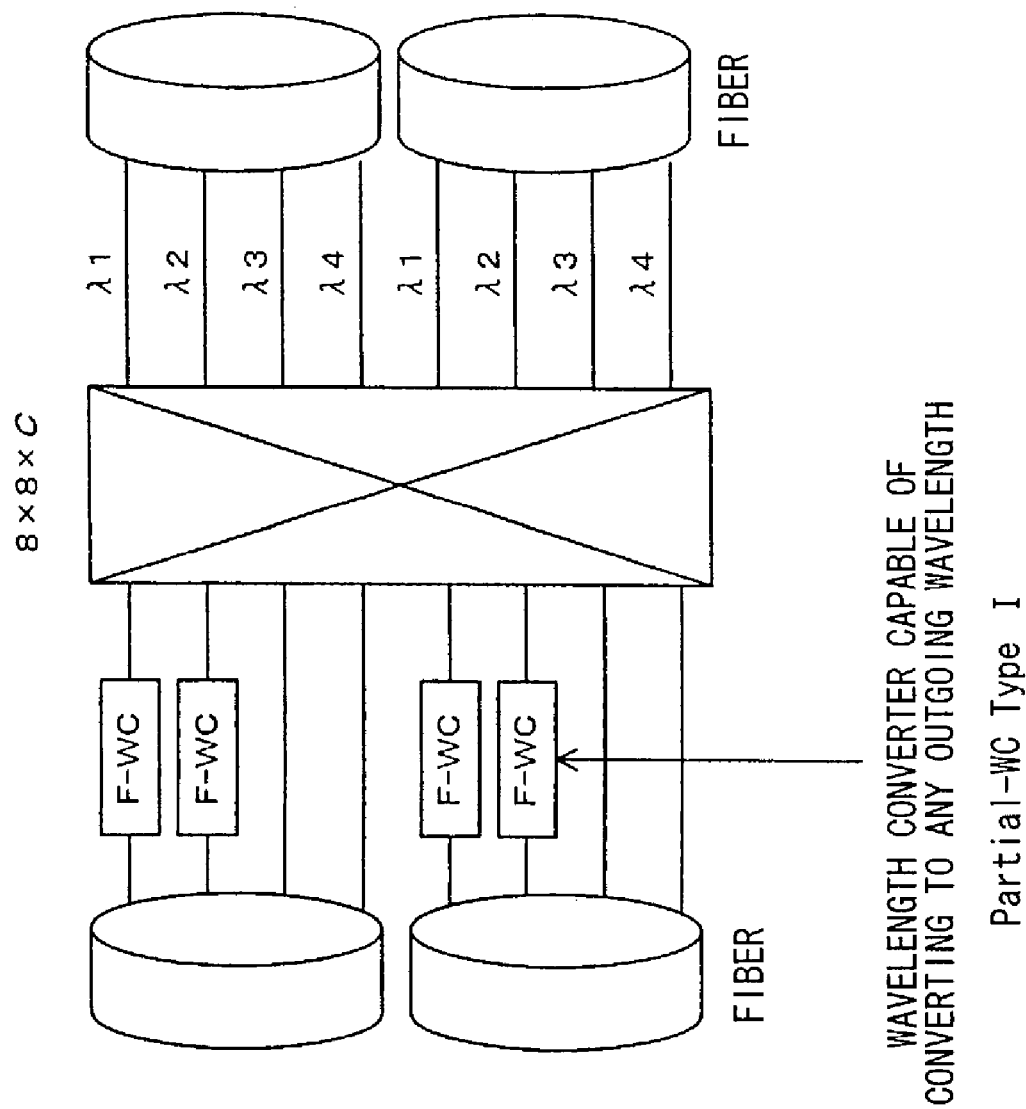
FIG. 15 is a figure showing a Partial-WC Type 1 node which is used in this seventh preferred embodiment of the present invention.

The seventh preferred embodiment of the present invention is shown in FIG. 14. The basic operation of this seventh preferred embodiment is the same as that of the fifth preferred embodiment. The point in which they differ is that a wavelength conversion capability is defined which indicates the degree of freedom in selection (hereinafter termed "selectivity") of a wavelength converter at each transit node, and the wavelength conversion capability which is consumed by wavelength conversion for the optical path which is newly set up is defined as the wavelength conversion cost. In other words, the following definitions are established:

$$Zij = \delta Cwc, ij(n) = Cwc, ij(n+1) - Cwc(n)$$

where n is the number of wavelength converters which are already employed for the optical paths which are already set up at the node in question, and Cwc(n) is the wavelength conversion capability at that time. An example of this definition of wavelength conversion capability is shown in FIGS. 15 through 18. The wavelength conversion capability is defined by the product of the number of wavelength converters, the selectivity of input fibers, the selectivity of incoming wavelengths, the selectivity of output fibers, and the selectivity of outgoing wavelengths. The wavelength conversion capability which is thus obtained is applied to each wavelength converter FIG. 15 shows a Partial-WC (Wavelength Conversion) Type 1 node. This is a type in which a wavelength converter is provided for each incoming wavelength channel (a WC per Input-Link Share structure). The incoming wavelengths of the wavelength converters of this structure are fixed. In the node shown in FIG. 15, if n=0 (in other words, if the optical paths which are already set up are not employing any wavelength converter at the subject node), then the wavelength conversion capability Cwc(0) is obtained as follows:

$$Cwc(0) = \text{number of wavelength converters} \times$$
$$\text{input port selectivity} \times \text{output port selectivity}$$
$$= 4 \times 1 \times 8$$
$$= 32$$

Figure 16:
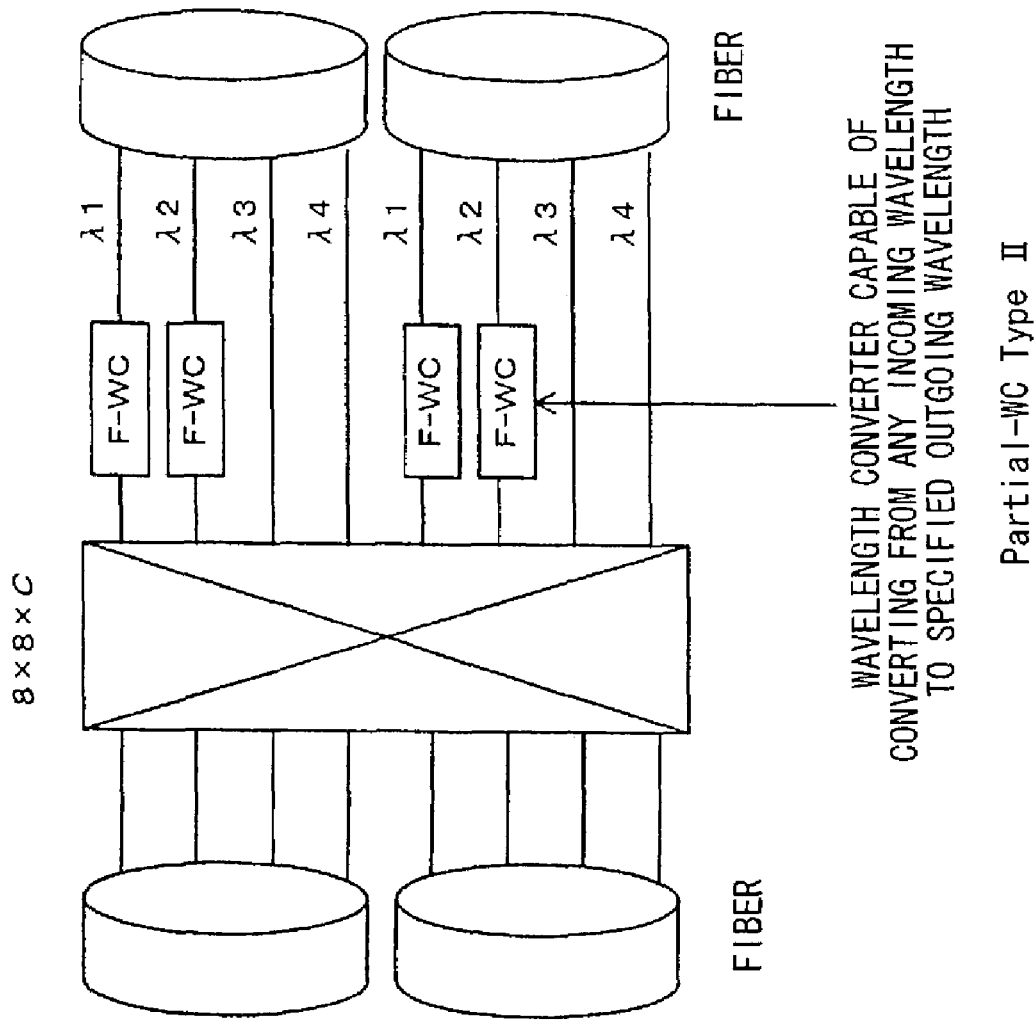
FIG. 16 is a figure showing a Partial-WC Type 2 node which is used in this seventh preferred embodiment of the present invention.

FIG. 16 shows a Partial-WC Type 2 node. This is a type in which a wavelength converter is provided for each outgoing wavelength channel (a WC per Output-Link Share structure). The outgoing wavelengths of the wavelength converters of this structure are fixed. In the node shown in FIG. 16, the wavelength conversion capability Cwc(0) is obtained as described below:

$$Cwc(0) = \text{number of wavelength converters} \times$$
$$\text{input port selectivity} \times \text{output port selectivity}$$
$$= 4 \times 8 \times 1$$
$$= 32$$

Figure 17:
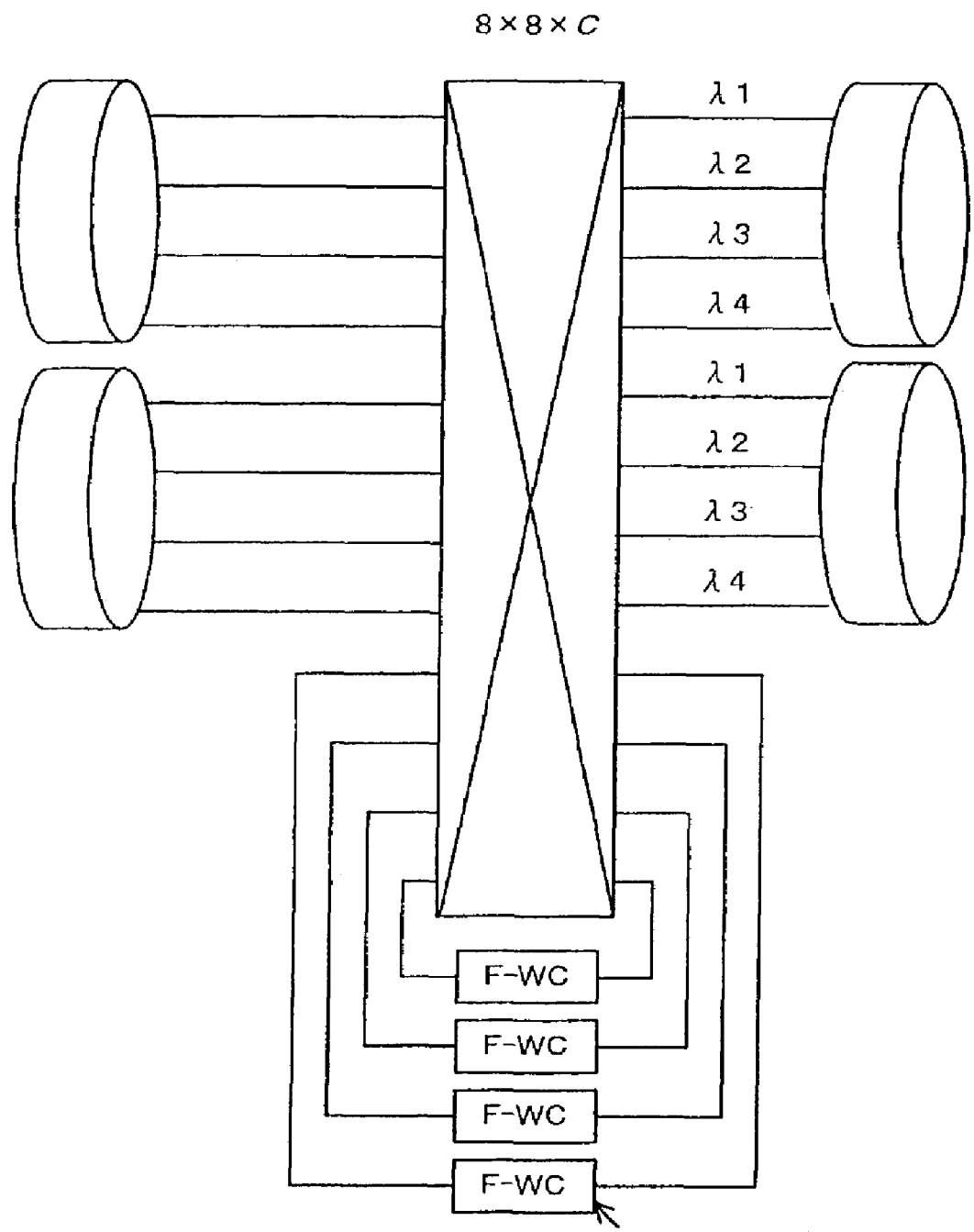
FIG. 17 is a figure showing a Partial-WC Type 3 node which is used in this seventh preferred embodiment of the present invention.

FIG. 17 shows a Partial-WC Type 3 node. This is a structure in which wavelength converters are possessed in common by the entire node (a WC per Node Share structure). In the node shown in FIG. 17, the wavelength conversion capability Cwc(0) is obtained as follows:

$$Cwc(0) = \text{number of wavelength converters} \times$$
$$\text{input port selectivity} \times \text{output port selectivity}$$
$$= 4 \times 8 \times 8$$
$$= 256$$

As for the number of wavelength converters, although there are the same number in each of the structures shown in FIG. 15 through FIG. 17. However, in the one shown in FIG. 17, each of the wavelength converters can be utilized for any of the fibers and any of the wavelength inputs, so that the selectivity is very much increased. The value defined for the wavelength conversion capability is accordingly increased to this extent.

Figure 18:
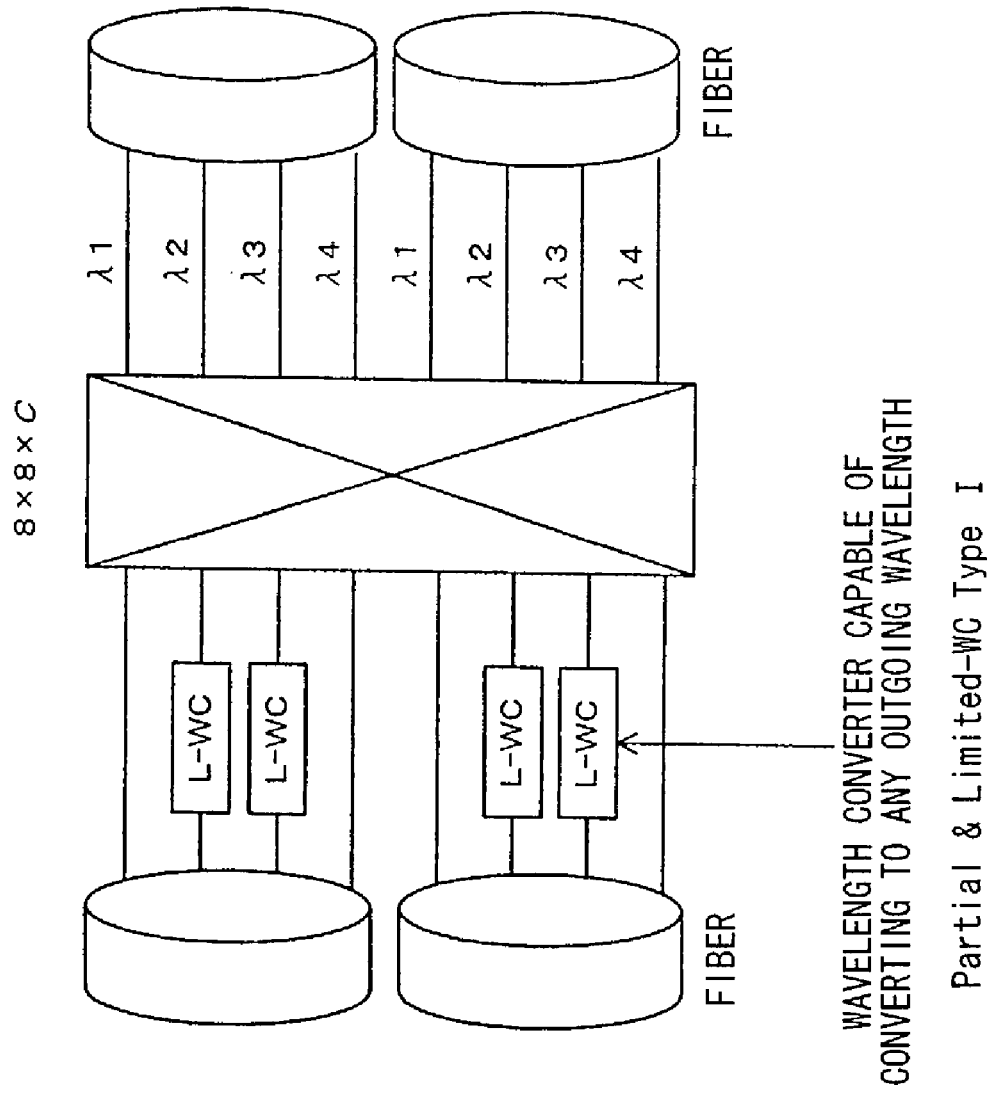
FIG. 18 is a figure showing a Partial & Limited-WC Type 1 node which is used in this seventh preferred embodiment of the present invention.
Figure 19:
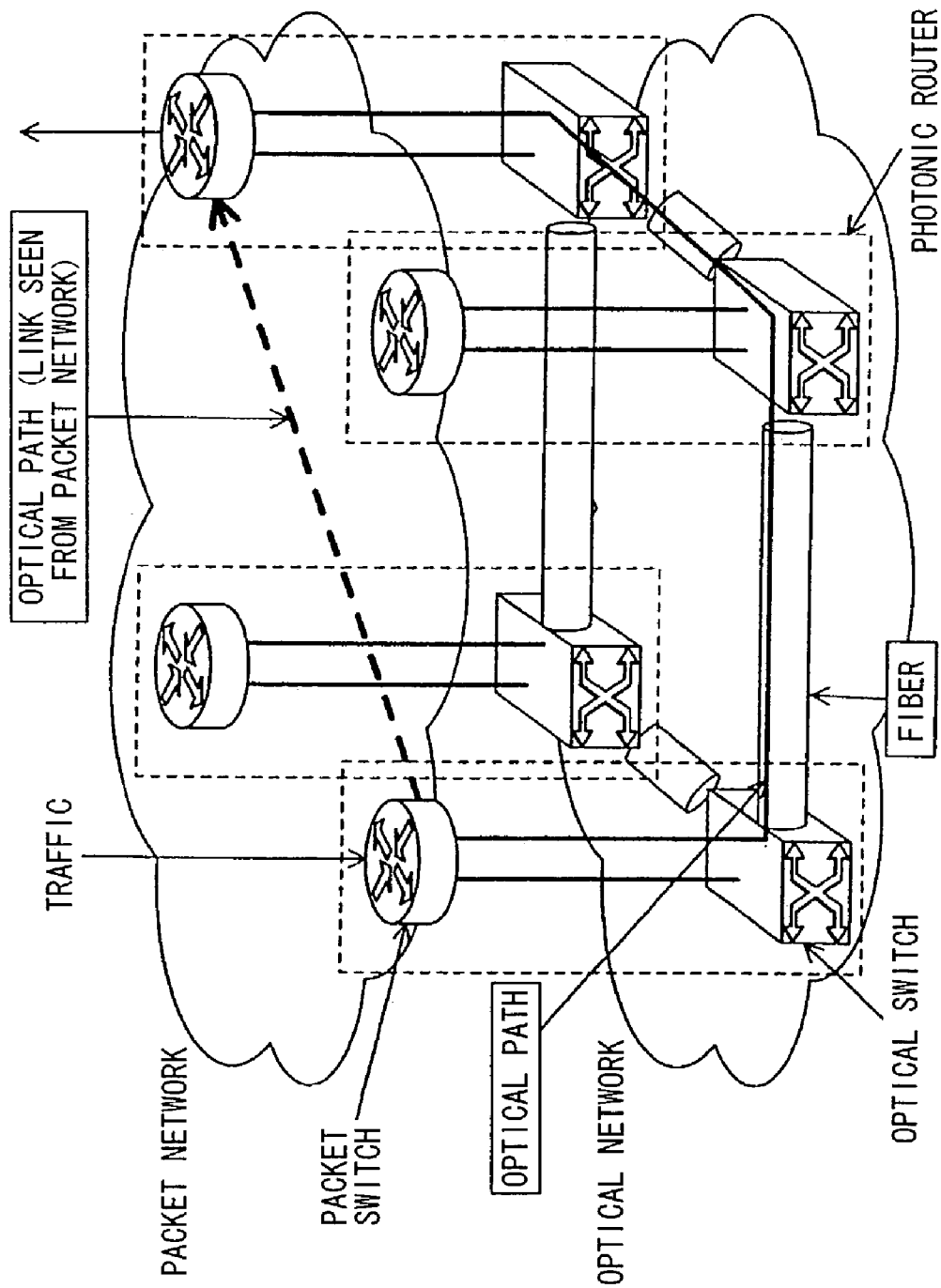
FIG. 19 is a general view of an optical path network which utilizes a photonic router.
Figure 20:
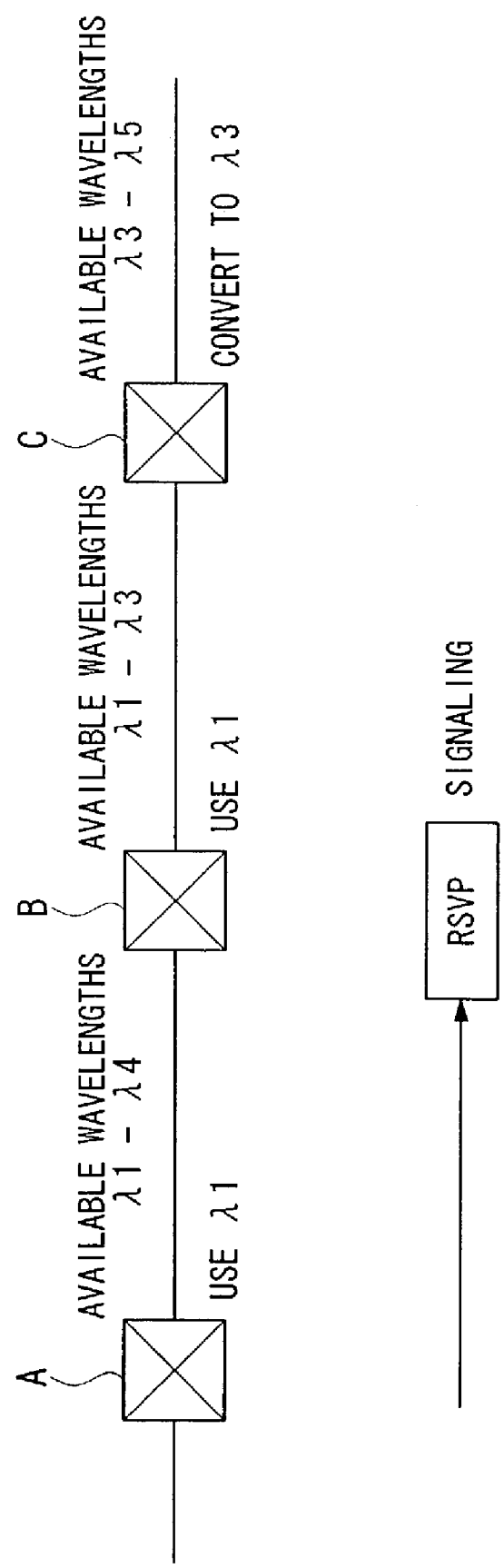
FIG. 20 is a figure for explanation of a conventional wavelength selection procedure.

The structure shown in FIG. 18 is one which uses a Limited-WC in which the wavelength selectivity of the wavelength converters is restricted. In this example, it is assumed that the wavelength converters each can only perform wavelength conversion between an incoming wavelength and a wavelength channel neighboring that incoming wavelength (in other words, the wavelength channel selectivity for one output fiber is 3). This is because the oscillation wavelength selectivity of the wavelength tunable laser light source for wavelength conversion which is used in each of the wavelength converters is extremely small. Furthermore, the overall structure of the optical switches and the wavelength converters is one which conforms to the structure shown in FIG. 15. The wavelength conversion capability $Cwc(0)$ for the node shown in FIG. 18 is obtained as follows:

$$Cwc(0) = \text{number of wavelength converters} \times$$
$$\text{input port selectivity} \times \text{output port selectivity}$$
$$= 4 \times 1 \times 6$$
$$= 24$$

These values give the wavelength conversion capability in the state in which no optical path has as yet been set up. The wavelength conversion cost $Lij$ which is defined in this state, can be estimated as the difference between the wavelength conversion capability after setting up an optical path from the input port #i (a number which takes account of both the fiber link and the wavelength) to the output port #j, and the wavelength conversion capability if no optical path is being accommodated.

On the other hand, as for the remaining wavelength conversion capability, this is the remaining wavelength conversion capability, in the state in which n optical paths have already been set up, after a further one more optical path has been set up between the optical switch ports #i and #j; and this is identical to $Cwc, ij(n+1)$. This may be considered as the wavelength conversion cost which is defined between the optical switch ports #i and #j of this node.

Moreover although, in the fifth through the seventh preferred embodiments of the present invention described above, a wavelength division multiplexing transmission network in which the wavelength channels are defined as optical channels has been premised, it would also be possible to apply the present invention to an optical time division multiplexing transmission network in which the optical channels are defined as time slots.

Eighth Preferred Embodiment

The function of controlling the node of the fifth through the seventh preferred embodiments of the present invention may be implemented using a computer device, which is an information processing device. In other words, by installing upon a computer device a program which implements, as a function of controlling a node which is employed in an optical path network of the fifth through the seventh preferred embodiments of the present invention, and by implementing a function, corresponding to the switching capability monitoring section 17, of calculating and storing, for this node, the cost which is required for passing from incoming optical channels to outgoing optical channels via an optical switch, or the cost which is required for wavelength conversion, respectively for a plurality of combinations of the incoming optical channels and the outgoing optical channels, by defining, as optical channel cost information, for each optical channel which is the object of a path setup request, the cost which is required for passing via optical switches, or the cost which is required for wavelength conversion, from the source node to the transit node through which the path setup request has transited, by implementing, as a function of the optical path setup management function section 11 in the transit node, a function of adding together the cost related to the optical channel which is the object of the path setup request included in the optical channel cost information which has arrived from the previous hop node and is written in the optical path setup request and the cost related to the optical channel which is stored in the switching capability monitoring section 17, summing the addition results as the cost from the plurality of incoming optical channels which are the object of the path setup request to the one outgoing optical channel which is the object of the path setup request, extracting the minimum value from among these costs which have been summed, obtaining the minimum values for all the outgoing optical channels which are the object of the path setup request, taking these minimum values as the optical channel cost information which has been updated by this node, and writing the numbers allocated to the incoming optical channels which yield the minimum values as optical channel tracking information into the path setup request which is transmitted to the next hop node; and by implementing, as a function which corresponds to the optical path setup management function section 11 in the destination node, a function of searching for the optical channel whose cost is the minimum from among the optical channels which are the objects of path setup requests at the previous hop node based upon the optical channel cost information which has arrived from the previous hop nodes and is written in the optical path setup requests, also recognizing respective incoming optical channels and outgoing optical channels for the transit nodes of transit nodes which have been transited, based upon the optical channel tracking information which corresponds to the optical channel cost information for the optical channel, and reserving the optical channel, it is possible to implement upon this computer device the function of controlling the node of the fifth through the seventh preferred embodiments of the present invention.

By recording the program according to any one of the fifth through the seventh preferred embodiments of the present invention upon a recording medium, it is possible to install this program according to any one of the fifth through the seventh preferred embodiments of the present invention upon a computer device, using this recording medium. Alternatively, it is possible to install this program according to any one of the fifth through the seventh preferred embodiments of the present invention directly upon a computer device via a network from a server upon which this program according to any one of the fifth through the seventh preferred embodiments of the present invention is stored.

By doing this it is possible, using a computer device, to enable setup of optical paths while restricting the number of wavelength converters which are employed, and, at this time, it is possible to set up the optical paths while taking account of the wavelength converter capability and the utilization status at each node, so that it becomes possible to restrict the number of wavelength converters which are required to be provided in the optical path network, and it is possible to implement a node which can reduce the cost of providing optical path network service.

What is claimed is:

1. An optical path communication network comprising: a source node; a destination node; and transit nodes which are deployed upon a route between the source node and the destination node, wherein:
   the source node comprises a unit which transmits an optical path setup request;
   the destination node comprises a unit which reserves a resource which is to be used for setting up an optical path based upon the optical path setup request, and a unit which transmits a resource reservation request;
   each of the transit nodes comprises a relay unit which, along with relaying towards the destination node the optical path setup request which has been received from a previous hop node, relays towards the source node the resource reservation request which has been received from a next hop node; and
   the source node and each of the transit nodes further comprise:
   a notification unit which notifies towards the destination node available resource information which specifies available resources related to its own node which are to be used for setting up an optical path;
   a pre-assignment unit which pre-assigns the available resources which the notification unit of each of their own nodes has notified, based upon the optical path setup request;
   an actual reservation unit which actually reserves one of the available resources which have been pre-assigned, based upon the resource reservation request; and
   a unit which releases the ones among the resources which have been pre-assigned other than the one thereof which is actually reserved.

2. An optical path communication network as described in claim 1, wherein:
   the notification unit of each of the transit nodes compares together the available resource information which has been notified by the previous hop node and available resource information of each of the transit nodes, and further notifies the available resource information related to available equivalent resources of the same type which are common to the previous hop node and each of the transit nodes towards the destination node;
   the destination node comprises a notification unit which compares together the available resource information which has been notified by the previous hop node and available resource information of the destination node, selects the information for any one available resource from among the available resource information related to available resources of the same type which are common to the previous hop node and the destination node, and notifies the selected information towards the source node as resource information to be used for setting up an optical path; and
   the source node comprises a unit which selects any K of available resources of the source node, where K is a natural number less than the number of aggregated resources, and takes the K available resources which have been selected as the available resource information which is notified by the notification unit of the source node.

3. An optical path communication network as described in claim 2, wherein each pre-assignment unit comprises a permission unit which permits overbooking of a plurality of connections which request setup to the K available resources which have been selected, and a unit which records the number of overbooked pre-assignments for each available resource which has been permitted by the permission unit, together with the available resource information;
   the notification units of the source node and the transit nodes notify available resource information which includes information relating to the number of overbooked pre-assignments for each available resource;
   each of the transit nodes comprises a unit which, for the same available resources, adds the number of overbooked pre-assignments of the available resources which each of the transit nodes has pre-assigned and the number of overbooked pre-assignments of the available resources which has been notified from the previous hop node; and
   the notification unit of the destination node comprises a unit which selects the one of the available resources in which the number of overbooked pre-assignments is the least as the available resource to be notified towards the source node.

4. An optical path communication network as described in claim 3, wherein each notification unit performs notification using signaling packets according to the RSVP protocol.

5. An optical path communication network as described in claim 2, wherein each notification unit performs notification using signaling packets according to the RSVP protocol.

6. An optical path communication network as described in claim 1, wherein each notification unit performs notification using signaling packets according to the RSVP (Resource Reservation Protocol) protocol.

7. An optical path communication network as described in claim 1, wherein:
   each of the nodes comprises a storage unit which calculates and stores, for each node, the cost which is required for passing from an incoming optical channel to an outgoing optical channel via an optical switch, or the cost which is required for wavelength conversion, respectively for a plurality of combinations of incoming optical channels and outgoing optical channels;
   the cost which is required for passing via optical switches, or the cost which is required for wavelength conversion, from the source node to the transit node through which the optical path setup request has transited is defined as optical channel cost information for each optical channel which is the object of a path setup request;
   the relay unit comprises a unit which adds together the cost related to the optical channel which is the object of the path setup request included in the optical channel cost information which has arrived from the previous hop node and is written in the optical path setup request and the cost related to the optical channel which is stored by the storage unit, sums the addition results as the cost from the plurality of incoming optical channels which are the object of the path setup request to one outgoing optical channel which is the object of the path setup request, extracts the minimum value from among the costs which have been summed, obtains the minimum values for all the outgoing optical channels which are the object of the path setup request, takes the minimum values as the optical channel cost information which has been updated by each of the transit node, and writes the numbers allocated to the incoming optical channels which yield the minimum values as optical channel tracking information into the optical path setup request which is transmitted to the next hop node; and the unit which reserves a resource, along with searching for the optical channel whose cost is the minimum from among the optical channels which are the object of path setup request at the previous hop node based upon the optical channel cost information which has arrived from the previous hop node and is written in the optical path setup request, and reserving the optical channel, recognizes respective incoming optical channels and outgoing optical channels for the transit nodes which have been transited, based upon the optical channel tracking information which corresponds to the optical channel cost information for the optical channel which has been searched, and directs the respective actual reservation units to reserve the optical channels which have been recognized.

8. An optical path communication network as described in claim 7, wherein the cost which is required for wavelength conversion in each node is established based upon the number of wavelength converters consumed and the remaining number thereof, or upon the amount of wavelength conversion capability consumed and the remaining amount thereof.

9. An optical path communication network as described in claim 8, wherein the wavelength conversion capability in each node is the product of the number of available wavelength converters, the total number of wavelength channels which can be input to the wavelength converters, the number of lines of incoming wavelength which can be selected by the wavelength converters, the total number of wavelength channels which can be output from the wavelength converters, and the number of lines of outgoing wavelength which can be selected by the wavelength converters.

10. A node which is utilized in an optical path communication network which comprises a source node, a destination node, and transit nodes which are deployed upon a route between the source node and the destination node, comprising:
a unit which transmits an optical path setup request, when the node operates as the source node;
a unit which reserves a resource which is to be used for setting up an optical path based upon the optical path setup request, when the node operates as the destination node;
a unit which transmits a resource reservation request, when the node operates as the destination node;
a relay unit which, along with relaying towards the destination node the optical path setup request which has been received from a previous hop node, relays towards the source node the resource reservation request which has been received from a next hop node, when the node operates as one of the transit nodes;
a notification unit which notifies towards the destination node available resource information which specifies available resources related to its own node which are to be used for setting up an optical path, when the node operates as the source node or as one of the transit nodes;
a pre-assignment unit which pre-assigns the available resources which the notification unit of its own node has notified, based upon the optical path setup request, when the node operates as the source node or as one of the transit nodes;
an actual reservation unit which actually reserves one of the available resources which have been pre-assigned, based upon the resource reservation request, when the node operates as the source node or as one of the transit nodes; and
a unit which releases the ones among the resources which have been pre-assigned other than the one thereof which is actually reserved, when the node operates as the source node or as one of the transit nodes.

11. A node as described in claim 10, wherein the notification unit further comprises:
a unit which compares together the available resource information which has been notified by the previous hop node and available resource information of its own node, and further notifies the available resource information related to available resources of the same type which are common to the previous hop node and its own node towards the destination node, when the node operates as one of the transit nodes;
a unit which compares together the available resource information which has been notified by the previous hop node and available resource information of its own node, selects the information for any one available resource from among the available resource information related to available resources of the same type which are common to the previous hop node and its own node, and notifies the selected information towards the source node as resource information to be used for setting up an optical path, when the node operates as the destination node; and
a unit which selects any K of available resources of its own node, and takes the K available resources which have been selected as the available resource information which is notified by the notification unit, when the node operates as the source node.

12. A node as described in claim 11, wherein the pre-assignment unit comprises a permission unit which permits overbooking of a plurality of connections which request setup to the K available resources which have been selected, and a unit which records the number of overbooked pre-assignments for each available resource which has been permitted by the permission unit, together with the available resource information;
the notification unit comprises:
a unit which notifies available resource information which includes information relating to the number of overbooked pre-assignments for each available resource;
a unit which, for the same available resources, adds the number of overbooked pre-assignments of the available resources which the node has pre-assigned and the number of overbooked pre-assignments of the available resources which has been notified from the previous hop node, when the node operates as one of the transit nodes; and
a unit which selects the one of the available resources in which the number of overbooked pre-assignments is the least as the available resource to be notified towards the source node, when the node operates as the destination node.

13. A node as described in claim 12, wherein each notification unit performs notification using signaling packets according to the RSVP protocol.

14. A node as described in claim 11, wherein each notification unit performs notification using signaling packets according to the RSVP protocol.

15. A node as described in claim 10, wherein each notification unit performs notification using signaling packets according to the RSVP protocol.

16. A node as described in claim 10, further comprising a storage unit which calculates and stores, for its own node, the cost which is required for passing from an incoming optical channel to an outgoing optical channel via an optical switch, or the cost which is required for wavelength conversion, respectively for a plurality of combinations of incoming optical channels and outgoing optical channels, and wherein:

the cost which is required for passing via optical switches, or the cost which is required for wavelength conversion, from the source node to the transit node through which the optical path setup request has transited is defined as optical channel cost information for each optical channel which is the object of a path setup request;

the relay unit comprises a unit which adds together the cost related to the optical channel which is the object of the path setup request included in the optical channel cost information which has arrived from the previous hop node and is written in the optical path setup request and the cost related to the optical channel which is stored by the storage unit, sums the addition results as the cost from the plurality of incoming optical channels which are the object of the path setup request to one outgoing optical channel which is the object of the path setup request, extracts the minimum value from among the costs which have been summed, obtains the minimum values for all the outgoing optical channels which are the object of the path setup request, takes the minimum values as the optical channel cost information which has been updated by its own node, and writes the numbers allocated to the incoming optical channels which yield the minimum values as optical channel tracking information into the optical path setup request which is transmitted to the next hop node; and the unit which reserves a resource, along with searching for the optical channel whose cost is the minimum from among the optical channels which are the objects of path setup requests at the previous hop node based upon the optical channel cost information which has arrived from the previous hop node and is written in the optical path setup request, and reserving the optical channel, recognizes respective incoming optical channels and outgoing optical channels for the transit nodes which have been transited, based upon the optical channel tracking information which corresponds to the optical channel cost information for the optical channel which has been searched, and directs the actual reservation units of the source node and the transit nodes to reserve the optical channels which have been recognized.

17. A node as described in claim 16, wherein the cost which is required for wavelength conversion in its own node is established based upon the number of wavelength converters consumed and the remaining number thereof, or upon the amount of wavelength conversion capability consumed and the remaining amount thereof.

18. A node as described in claim 17, wherein the wavelength conversion capability in its own node is the product of the number of available wavelength converters, the total number of wavelength channels which can be input to the wavelength converters, the number of lines of incoming wavelength which can be selected by the wavelength converters, the total number of wavelength channels which can be output from the wavelength converters, and the number of lines of outgoing wavelength which can be selected by the wavelength converters.

19. A program which, by being installed upon a computer-readable recording medium of a node device, implements upon the node device functions which correspond to each node which is employed in an optical path communication network which comprises a source node, a destination node, and transit nodes which are deployed upon a route between the source node and the destination node, the program comprising the functions of:

as a function when operating as the source node, implements a function of transmitting an optical path setup request;

as a function when operating as the destination node, implements a function of reserving a resource which is to be used for setting up an optical path based upon the optical path setup request, and a function of transmitting a resource reservation request;

as a function when operating as one of the transit nodes, implements a relay function of relaying towards the destination node the optical path setup request which has been received from a previous hop node, and relaying towards the source node the resource reservation request which has been received from a next hop node; and as a function when operating as the source node or as one of the transit nodes, implements a notification function of notifying towards the destination node available resource information which specifies available resources related to its own node which are to be used for setting up an optical path, a pre-assignment function of pre-assigning the available resources which the notification function of its own node has notified, based upon the optical path setup request, an actual reservation function of actually reserving one of the available resources which have been pre-assigned, based upon the resource reservation request, and a function of releasing the ones among the resources which have been pre-assigned other than the one thereof which is actually reserved.

20. A program as described in claim 19, wherein the notification function further implements the functions of:

as a function when operating as one of the transit nodes, comparing together the available resource information which has been notified by the previous hop node and available resource information of its own node, and further notifying the available resource information related to available resources of the same type which are common to the previous hop node and its own node towards the destination node;

as a function when operating as the destination node, implements a function of comparing together the available resource information which has been notified by the previous hop node and available resource information of its own node, selecting the information for any one available resource from among the available resource information related to available resources of the same type which are common to the previous hop node and its own node, and notifying the selected information towards the source node as resource information to be used for setting up an optical path; and as a function when operating as the source node, implements a function of selecting any K of available resources of its own node, and taking the K available resources which have been selected as the available resource information which is notified by the notification function.

21. A program as described in claim 20, wherein as the pre-assignment function, there are implemented:

a permission function of permitting overbooking of a plurality of connections which request setup to the K available resources which have been selected; and a function of recording the number of overbooked pre-assignments for each available resource which has been permitted by the permission function, together with the available resource information, and wherein as the notification function, there are implemented:

as a function when operating as the source node or as one of the transit nodes, a function of notifying available resource information which includes information relating to the number of overbooked pre-assignments for each available resource;

as a function when operating as one of the transit nodes, a function of, for the same available resources, adding the number of overbooked pre-assignments of the available resource which its own node has pre-assigned and the number of overbooked pre-assignments of the available resource which has been notified from the previous hop node; and as a function when operating as the destination node, a function of selecting the one of the available resources in which the number of overbooked pre-assignments is the least as the available resource to be notified towards the source node.

22. A program as described in claim 21, wherein, as each notification function, there is implemented a function of performing notification using signaling packets according to the RSVP protocol.

23. A recording medium upon which a program as described in claim 22 is recorded, which can be read in by the node device.

24. A recording medium upon which a program as described in claim 21 is recorded, which can be read in by the node device.

25. A program as described in claim 20, wherein, as each notification function, there is implemented a function of performing notification using signaling packets according to the RSVP protocol.

26. A recording medium upon which a program as described in claim 25 is recorded, which can be read in by the node device.

27. A recording medium upon which a program as described in claim 20 is recorded, which can be read in by the device.

28. A program as described in claim 19, wherein, as each notification function, there is implemented a function of performing notification using signaling packets according to the RSVP protocol.

29. A recording medium upon which a program as described in claim 28 is recorded, which can be read in by the node device.

30. A program as described in claim 19, wherein, as a function which corresponds to each the node, there is implemented a storage function of calculating and storing, for each node, the cost which is required for passing from an incoming optical channel to an outgoing optical channel via an optical switch, or the cost which is required for wavelength conversion, respectively for a plurality of combinations of incoming optical channels and outgoing optical channels, and of defining, as optical channel cost information for each optical channel which is the object of a path setup request, the cost which is required for passing via optical switches, or the cost which is required for wavelength conversion, from the source node to the transit node through which the optical path setup request has transited;

as the relay function, there is implemented a function of adding together the cost related to the optical channel which is the object of the path setup request included in the optical channel cost information which has arrived from the previous hop node and is written in the optical path setup request and the cost related to the optical channel which is stored in its own node, summing the addition results as the cost from the plurality of incoming optical channels which are the object of the path setup request to one outgoing optical channel which is the object of the path setup request, extracting the minimum value from among the costs which have been summed, obtaining the minimum values for all the outgoing optical channels which are the object of the path setup request, taking the minimum values as the optical channel cost information which has been updated by its own node, and writing the numbers allocated to the incoming optical channels which yield the minimum values as optical channel tracking information into the optical path setup request which is transmitted to the next hop node; and as the function of reserving a resource, there is implemented a function of, along with searching for the optical channel whose cost is the minimum from among the optical channels which are the objects of path setup requests at the previous hop node based upon the optical channel cost information which has arrived from the previous hop node and is written in the optical path setup request, reserving the optical channel, recognizing respective incoming optical channels and outgoing optical channels for the transit nodes which have been transited, based upon the optical channel tracking information which corresponds to the optical channel cost information for the optical channel which has been searched, and directing the actual reservation functions of the source node and the transit nodes to reserve the optical channels which have been recognized.

31. A program as described in claim 30, wherein the cost which is required for wavelength conversion in its own node is established based upon the number of wavelength converters consumed and the remaining number thereof, or upon the amount of wavelength conversion capability consumed and the remaining amount thereof.

32. A recording medium upon which a program as described in claim 31 is recorded, which can be read in by the node device.

33. A program as described in claim 31, wherein the wavelength conversion capability in its own node is the product of the number of available wavelength converters, the total number of wavelength channels which can be input to the wavelength converters, the number of lines of incoming wavelength which can be selected by the wavelength converters, the total number of wavelength channels which can be output from the wavelength converters, and the number of lines of outgoing wavelength which can be selected by the wavelength converters.

34. A recording medium upon which a program as described in claim 33 is recorded, which can be read in by the node device.

35. A recording medium upon which a program as described in claim 30 is recorded, which can be read in by the node device.

36. A recording medium upon which a program as described in claim 19 is recorded, which can be read in by the node device.

37. A method of setting up an optical path, applied to an optical path communication network which comprises a source node, a destination node, and transit nodes which are deployed upon a route between the source node and the destination node, comprising the steps of:

using the source node to transmit an optical path setup request, towards the destination node, said request including source node notification of available resource information which specifies available resources related to the source node which are to be used for setting up an optical path, and using the source node to pre-assign the available resources specified in said source node notification;

using each of the transit nodes to relay towards the destination node the optical path setup request which has been received from a previous hop node, using each of the transit nodes to forward transit node notification towards the destination node containing available resource information which specifies available resources related to each of the transit nodes, and using each of the transit nodes to pre-assign the available resources upon which its own node transit node notification is based;

using the destination node to reserve a resource which is to be used for setting up an optical path based upon the optical path setup request which has been received from the previous hop node, and using the destination node to transmit a resource reservation request towards the source node;

using each of the transit nodes to relay towards the source node the resource reservation request which has been received from a next hop node, and using each of the transit nodes to actually reserve one of the available resources which have been pre-assigned, based upon the resource reservation request, and releases the ones among the resources which have been pre-assigned other than the one thereof which is actually reserved; and using the source node to actually reserve one of the available resources which have been pre-assigned, based upon the resource reservation request which has been received from the next hop node, and using the source node to release the ones among the resources which have been pre-assigned other than the one thereof which is actually reserved.

38. A method of setting up an optical path as described in claim 37, further comprising:

utilizing each of the transit nodes to compare together the available resource information which has been notified by the previous hop node and available resource information of each of the transit nodes, and further notifies the available resource information related to available resources of the same type which are common to the previous hop node and each of the transit nodes towards the destination node;

utilizing the destination node to compare together the available resource information which has been notified by the previous hop node and available resource information of the destination node, selects the information for any one available resource from among the available resource information related to available resources of the same type which are common to the previous hop mode and the destination node, and notifies the selected information towards the source node as resource information to be used for setting up an optical path; and utilizing the source node to select any K of available resources of the source node, and takes the K available resources which have been selected as the available resource information notified towards the destination node.

39. A method of selling up an optical path as described in claim 38, further comprising:

using the source node and the transit nodes to permit overbooking of a plurality of connections which request setup to the K available resources which have been selected, to record together the number of overbooked pre-assignments for each available resource which has been permitted with the available resource information, and to notify available resource information which includes information relating to the number of overbooked pre-assignments for each available resource;

using each of the transit nodes to add together, for the same available resources, the number of the overbooked pre-assignments of the available resource which each of the transit nodes has pre-assigned and the number of the overbooked pre-assignments of the available resource which has been notified from the previous hop node;

using the destination node to select the one of the available resources in which the number of the overbooked pre-assignments is the least as the available resource to be notified towards the source node.

40. A method of setting up an optical path as described in claim 39, wherein each notification is performed using signaling packets according to the RSVP protocol.

41. A method of setting up an optical path as described in claim 38, wherein each notification is performed using signaling packets according to the RSVP protocol.

42. A method of setting up an optical path as described in claim 37, wherein each notification is performed using signaling packets according to the RSVP protocol.

43. A method of setting up an optical path as described in claim 37, wherein:

using each node to calculate and store, for each node, the cost which is required for passing from an incoming optical channel to an outgoing optical channel via an optical switch, or the cost which is required for wavelength conversion, respectively for a plurality of combinations of the incoming optical channels and the outgoing optical channels;

wherein the cost which is required for passing via optical switches, or the cost which is required for wavelength conversion, from the source node to the transit node through which the optical path setup request has transited is defined as optical channel cost information for each optical channel which is the object of a path setup request;

using each of the transit nodes to add together the cost related to the optical channel which is the object of the path setup request included in the optical channel cost information which has arrived from the previous hop node and is written in the optical path setup request and the cost related to the optical channel which is stored in each of the transit nodes, to sum the addition results as the cost from the plurality of incoming optical channels which are the object of the path setup request to the one outgoing optical channel which is the object of the path setup request, to extract the minimum value from among the costs which have been summed, to obtain the minimum values for all the outgoing optical channels which are the object of the path setup request, takes the minimum values as the optical channel cost information which has been updated by each of the transit nodes, and to write the numbers allocated to the incoming optical channels which yield the minimum values as optical channel tracking information into the optical path setup request which is transmitted to the next hop node; and using the destination node, to search for the optical channel whose cost is the minimum from among the optical channel cost information of the optical channels which are the objects of path setup requests at the previous hop node which has arrived from the previous hop node and is written in the optical path setup request, and using the destination node to reserve the optical channel, to recognize respective incoming optical channels and outgoing optical channels for the transit nodes which have been transited, based upon the optical channel tracking information which corresponds to the optical channel cost information for the optical channels which has been searched, and to direct the source node and the transit nodes to reserve the optical channels which have been recognized.

44. A method of setting up an optical path as described in claim 43, wherein the cost which is required for wavelength conversion in each node is established based upon the number of wavelength converters consumed and the remaining number thereof, or upon the amount of wavelength conversion capability consumed and the remaining amount thereof.

45. A method of setting up an optical path as described in claim 44, wherein the wavelength conversion capability in each node is the product of the number of available wavelength converters, the total number of wavelength channels which can be input to the wavelength converters, the number of lines of incoming wavelength which can be selected by the wavelength converters, the total number of wavelength channels which can be output from the wavelength converters, and the number of lines of outgoing wavelength which can be selected by the wavelength converters.

* * * * *